United States Patent
Kim et al.

(10) Patent No.: US 10,116,505 B2
(45) Date of Patent: Oct. 30, 2018

(54) DEVICE CONTROL METHOD FOR REGISTERING DEVICE INFORMATION OF PERIPHERAL DEVICE, AND DEVICE AND SYSTEM THEREOF

(71) Applicant: SAMSUNG ELECTRONICS CO., LTD., Suwon-si (KR)

(72) Inventors: Sung-won Kim, Suwon-si (KR); Jae-woo Ko, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 567 days.

(21) Appl. No.: 14/104,720

(22) Filed: Dec. 12, 2013

(65) Prior Publication Data

US 2014/0173069 A1  Jun. 19, 2014

(30) Foreign Application Priority Data

Dec. 13, 2012  (KR) .................. 10-2012-0145710
May 2, 2013   (KR) .................. 10-2013-0049615

(51) Int. Cl.
*G06F 15/177* (2006.01)
*H04L 12/24* (2006.01)
(Continued)

(52) U.S. Cl.
CPC .......... *H04L 41/082* (2013.01); *H04L 12/282* (2013.01); *H04L 12/2809* (2013.01);
(Continued)

(58) Field of Classification Search
CPC ..................... H04L 29/06; H04L 29/08981
(Continued)

(56) References Cited

U.S. PATENT DOCUMENTS 6,779,004 B1 * 8/2004 Zintel ................. H04L 12/2803
709/227
7,583,686 B2   9/2009 Shitano et al.
(Continued)

FOREIGN PATENT DOCUMENTS

CA    2 525 490 A1    11/2004
CN     1453696 A      11/2003
(Continued)

OTHER PUBLICATIONS

Communication, Issued by the European Patent Office, dated Jan. 5, 2015, in counterpart European Application No. 13197180.6.
(Continued)

*Primary Examiner* — Vivek Srivastava
*Assistant Examiner* — Atta Khan
(74) *Attorney, Agent, or Firm* — Sughrue Mion, PLLC

(57) ABSTRACT

A method, a device, and a system enabling an external device to control a peripheral device by using device information stored in a network device. The device control method includes obtaining device information regarding the first peripheral device, wherein the obtaining is performed by the user device; transmitting the device information regarding the first peripheral device to the network device, wherein the transmitting is performed by the user device; storing the device information, wherein the storing is performed by the network device; and controlling the first peripheral device by using the device information, wherein the controlling is performed by a second peripheral device connected to the network device.

32 Claims, 36 Drawing Sheets

(51) Int. Cl.
*H04L 29/08* (2006.01)
*H04L 29/06* (2006.01)
*H04L 12/28* (2006.01)
*H04W 12/06* (2009.01)

(52) U.S. Cl.
CPC .......... *H04L 63/0884* (2013.01); *H04L 67/16* (2013.01); *H04L 67/303* (2013.01); *H04L 67/34* (2013.01); *H04W 12/06* (2013.01)

(58) Field of Classification Search
USPC ........................................................ 709/221
See application file for complete search history.

(56) References Cited

U.S. PATENT DOCUMENTS

| | | | |
|---|---|---|---|
| 8,103,744 B2 | 1/2012 | Yoshihara et al. | |
| 8,169,641 B2 | 5/2012 | Kudo | |
| 8,443,060 B2 | 5/2013 | Kemp et al. | |
| 8,477,350 B2* | 7/2013 | Jazayeri | G06F 3/1204 358/1.15 |
| 8,498,572 B1* | 7/2013 | Schooley | H04B 5/0031 455/41.1 |
| 8,937,930 B2 | 1/2015 | Sprigg et al. | |
| 2002/0156947 A1 | 10/2002 | Nishio | |
| 2002/0186121 A1* | 12/2002 | Yoshikawa | G07C 9/00111 340/5.28 |
| 2003/0100962 A1 | 5/2003 | Sumita et al. | |
| 2003/0220988 A1 | 11/2003 | Hymel | |
| 2004/0136027 A1 | 7/2004 | Zehler | |
| 2005/0034160 A1* | 2/2005 | Kim | H04L 12/2805 725/80 |
| 2005/0160157 A1* | 7/2005 | Collier | G06F 9/4413 709/222 |
| 2005/0243777 A1* | 11/2005 | Fong | H04L 12/66 370/338 |
| 2007/0112909 A1* | 5/2007 | Miyamoto | H04L 12/281 709/200 |
| 2007/0277183 A1 | 11/2007 | Muramatsu et al. | |
| 2008/0030363 A1* | 2/2008 | Rezvani | G06F 21/31 340/4.3 |
| 2008/0069011 A1 | 3/2008 | Sekaran et al. | |
| 2008/0255692 A1 | 10/2008 | Hofrichter et al. | |
| 2009/0144629 A1 | 6/2009 | Ferlitsch et al. | |
| 2009/0150356 A1* | 6/2009 | Walker | H04L 12/2809 |
| 2009/0319613 A1 | 12/2009 | Hjelm et al. | |
| 2009/0328174 A1 | 12/2009 | Cen et al. | |
| 2010/0039958 A1 | 2/2010 | Ge et al. | |
| 2011/0032071 A1* | 2/2011 | Tondering | H04B 1/202 340/4.31 |
| 2011/0205965 A1 | 8/2011 | Sprigg et al. | |
| 2012/0005298 A1 | 1/2012 | Choi | |
| 2012/0171951 A1 | 7/2012 | 't Hooft | |
| 2012/0197977 A1 | 8/2012 | Nagasaka et al. | |
| 2014/0304502 A1* | 10/2014 | Su | H04W 4/02 713/154 |

FOREIGN PATENT DOCUMENTS

| | | |
|---|---|---|
| CN | 101131795 A | 2/2008 |
| CN | 102591595 A | 7/2012 |
| CN | 10264854 A | 8/2012 |
| EP | 1 414 264 A1 | 4/2004 |
| EP | 1 956 572 A1 | 8/2008 |
| JP | 2003-230184 A | 8/2003 |
| JP | 2005-311773 A | 11/2005 |
| JP | 2007-53530 A | 3/2007 |
| JP | 2007-97057 A | 4/2007 |
| JP | 2007-243458 A | 9/2007 |
| JP | 2008-15616 A | 1/2008 |
| JP | 2008-035108 A | 2/2008 |
| JP | 2009-122968 A | 6/2009 |
| JP | 2010-128728 A | 6/2010 |
| RU | 2 308 080 C2 | 10/2007 |
| RU | 2 348 066 C2 | 2/2009 |
| RU | 2 459 371 C2 | 8/2012 |
| WO | 2012/092141 A1 | 7/2012 |

OTHER PUBLICATIONS

Communication issued by the State Intellectual Property Office of P.R. China dated Oct. 10, 2017 in counterpart Chinese Patent Application No. 201310684387.2.
Communication issued by the Russian Patent and Trademark Office dated Oct. 12, 2017 in counterpart Russian Patent Application No. 2015127781.
Communication issued by the Australian Patent Office dated Nov. 24, 2017 in counterpart Australian Patent Application No. 2013360575.
Communication issued by the Japanese Patent Office dated Dec. 25, 2017 in counterpart Japanese Patent Application No. 2013-257988.
International Search Report (PCT/ISA/210) dated Mar. 12, 2014 issued by the International Searching Authority in counterpart International Application No. PCT/KR2013/011442.
Communication dated Aug. 19, 2014 issued by the European Patent Office in counterpart European Patent Application No. 13197180.6.
Chung-Ming Huang et al.; "Design and implementation of an adaptive Web2.0 QoS-based home appliance control service platform"; Software—Practice and Experience; vol. 42; No. 1; Feb. 8, 2011; pp. 57-87; DOI: 10.1002/spe.1049.
Communication dated May 16, 2018, issued by the Chinese Patent Office in counterpart Chinese Application No. 201310684387.2

* cited by examiner

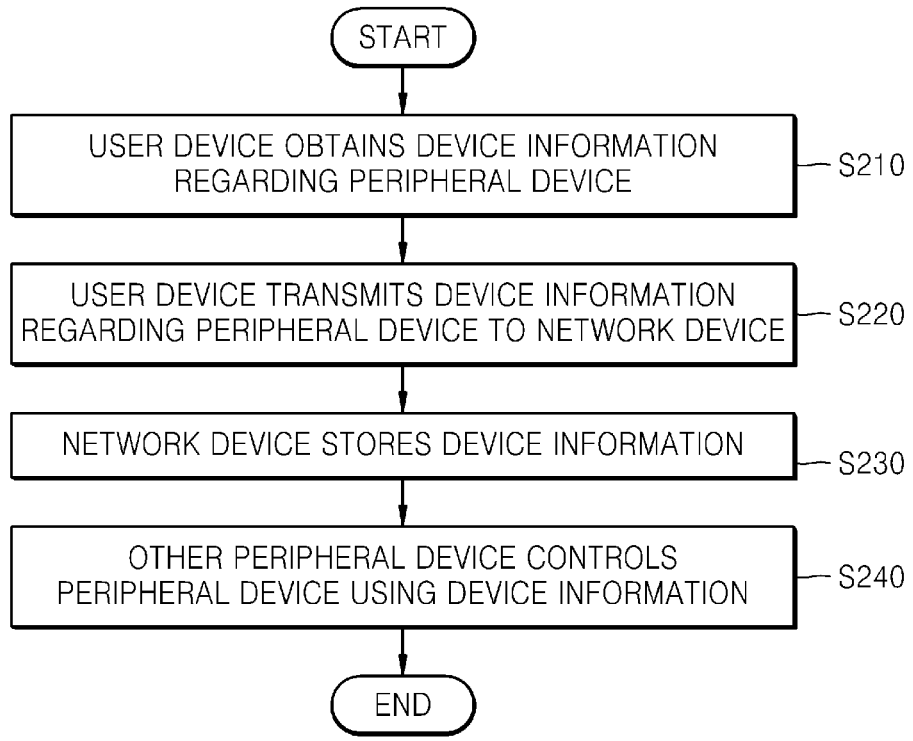
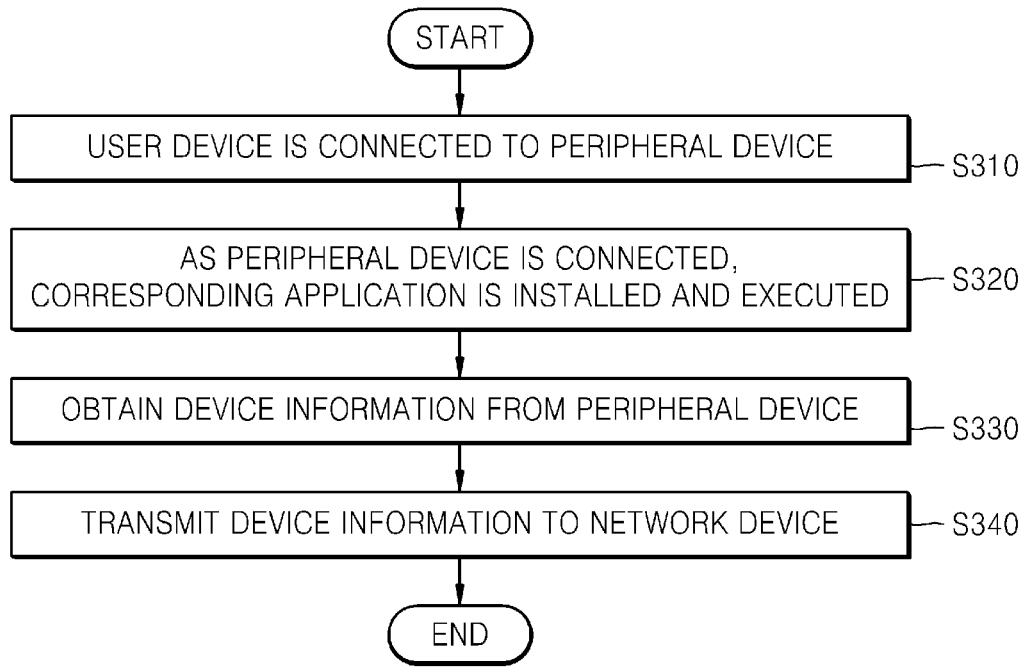

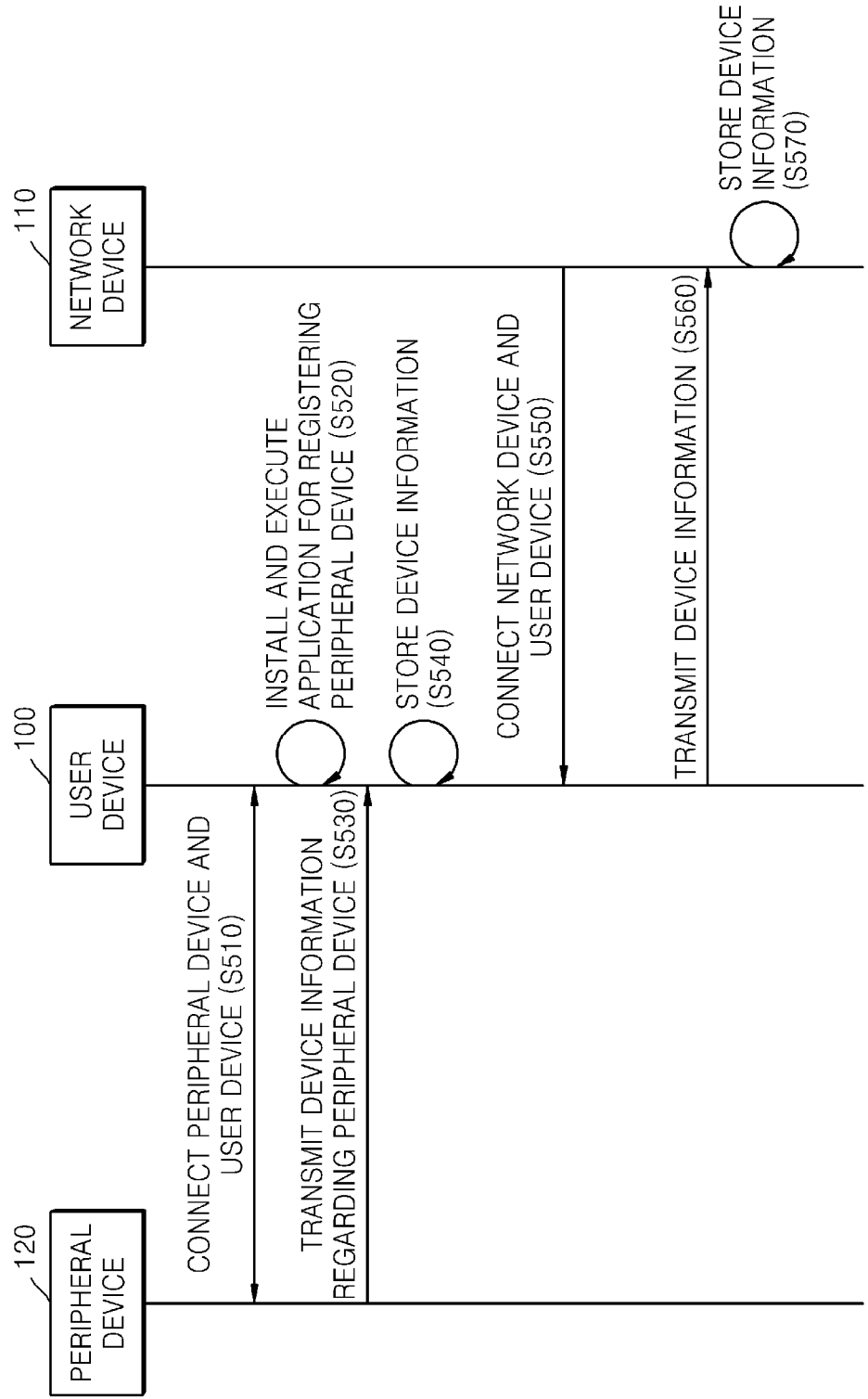

FIG. 35

| NAME | ID | GROUP | NETWORK | IP | MAC | PORT | CURRENT STATUS | TOTAL TIME OF USE | NUMBER OF CONNECTIONS |
|---|---|---|---|---|---|---|---|---|---|
| TV | 1 | DISPLAY | WiFi | xxx.xxx.xxx.xxx | xx-xx-xx-xx | 8000 | ON | 3h30m | 5 |
| SPEAKER | 2 | AUDIO | WiFi BLUETOOTH | xxx.xxx.xxx.xxx | xx-xx-xx-xx | 5000 | ON | 4h | 4 |
| AIR CONDITIONER | 3 | HOUSEHOLD APPLIANCES | WiFi | xxx.xxx.xxx.xxx | xx-xx-xx-xx | 5800 | OFF | 3h | 3 |
| REFRIGERATOR | 4 | HOUSEHOLD APPLIANCES | BLUETOOTH | xxx.xxx.xxx.xxx | xx-xx-xx-xx | 7000 | ON | 2h | 1 |

DEVICE CONTROL METHOD FOR REGISTERING DEVICE INFORMATION OF PERIPHERAL DEVICE, AND DEVICE AND SYSTEM THEREOF

CROSS-REFERENCE TO RELATED PATENT APPLICATION

This application claims the benefits of Korean Patent Application No. 10-2012-0145710, filed on Dec. 13, 2012, and Korean Patent Application No. 10-2013-0049615, filed on May 2, 2013, in the Korean Intellectual Property Office, the disclosures of which are incorporated herein in their entirety by reference.

BACKGROUND

1. Field

The exemplary embodiment relate to a method, a device, and a system for controlling devices such as to register device information of a peripheral device to another device. Thus, the other device may use the peripheral device which may be connected to a user device.

2. Description of the Related Art

In order to provide services via various user devices including mobile terminals, personal computers (PCs), and televisions (TVs), the services may be provided via various peripheral devices, such as earphones, headphones, or display devices.

Here, device information of peripheral devices may be stored in a network device, so that an arbitrary device may access the network device and use the peripheral devices by using the device information stored in the network device. Therefore, it is necessary to simplify the storing of device information of peripheral devices in the network device and the using of the peripheral devices by using the stored device information.

SUMMARY

Exemplary embodiments provide a method, a device, and a system for easily storing device information regarding a peripheral device connected to a user device.

Exemplary embodiments also provide a method, a device, and a system for an external device to control a peripheral device by using device information stored in a network device.

According to an aspect, there is provided a device control method for controlling a device in a system including a user device and a peripheral device and a network device connected to the user device, the device control method including obtaining device information regarding the first peripheral device, wherein the obtaining is performed by the user device; transmitting the device information regarding the first peripheral device to the network device, wherein the transmitting is performed by the user device; storing the device information, wherein the storing is performed by the network device; and controlling the first peripheral device by using the device information, wherein the controlling is performed by a second peripheral device connected to the network device, wherein the device information includes information for recognizing the first peripheral device.

The device information further includes a uniform resource locator (URL) information for downloading an application for controlling the first peripheral device, and the device control method further includes downloading and installing the application based on the URL information, wherein the downloading and the installing are performed by the second peripheral device.

The controlling of the first peripheral device by the second peripheral device includes transmitting a control instruction for controlling the first peripheral device to the user device, wherein the transmitting is performed by the second peripheral device; and controlling the first peripheral device based on the control instruction, wherein the controlling is performed by the user device.

The device control method further includes connecting to the network device and receiving authorization for controlling the first peripheral device, wherein the connecting and the receiving are performed by the second peripheral device; and controlling the first peripheral device, wherein the controlling is performed by the second peripheral device.

The authorization for controlling the first peripheral device is valid for a corresponding number of times, a corresponding period of time, or a corresponding control operation.

The connecting to the network device and receiving of the authorization for controlling the first peripheral device includes recognizing the second peripheral device, wherein the recognizing is performed by the network device; and receiving authorization based on a result of the recognition, wherein the receiving is performed by the second peripheral device.

The transmitting of the device information includes, if the network device is connected to the user device, requesting the user device to transmit the device information, wherein the requesting is performed by the network device; and transmitting the device information to the user device in response to the request, wherein the transmitting is performed by the user device.

The device control method further includes transmitting connection information regarding the network device to the first peripheral device, wherein the transmitting is performed by the user device; and transmitting the device information to the network device based on the connection information regarding the network device, wherein the transmitting is performed by the first peripheral device.

The device control method further includes transmitting information regarding a recommended service in relation to the device information to the user device, wherein the transmitting is performed by the network device.

The device control method further includes receiving the device information from the network device, wherein the receiving is performed by the user device; and, if the user device is connected to another network device, transmitting the device information to the other network device, wherein the transmitting is performed by the user device, wherein the other network device controls peripheral devices connected to the other network device by using the device information.

According to another aspect, there is provided a device control method by which a network device registers a first peripheral device connected to a user device, the device control method including receiving device information regarding the first peripheral device based on a connection to the user device; storing the device information in the network device; and transmitting the device information to a second peripheral device connected to the network device, wherein the device information includes information for recognizing the first peripheral device.

The device information further includes a uniform resource locator (URL) information for downloading an application for controlling the first peripheral device.

The device control method further includes transmitting a control instruction received from the second peripheral device to the user device, wherein the control instruction is an instruction for controlling the first peripheral device.

The device control method further includes recognizing the second peripheral device; and allocating an ID to the second peripheral device based on a result of the recognition, wherein the second peripheral device controls the first peripheral device based on authorization corresponding to the ID.

In the transmitting of the device information, the ID is also transmitted to the second peripheral device.

The authorization for controlling the first peripheral device is valid for a corresponding period of time or a corresponding control operation.

The receiving of the device information regarding the first peripheral device from the user device includes, if the network device is connected to the user device, requesting the user device for the device information, where the requesting is performed by the network device; and receiving the device information regarding the first peripheral device from the user device, where the receiving is performed by the network device.

The receiving of the device information includes connecting to the network device, wherein the connecting is performed by the first peripheral device; and receiving the device information from the first peripheral device.

The device control method further includes transmitting information regarding recommended services in relation to the device information to the user device.

According to another aspect, there is provided a device control method by which a user device registers a first peripheral device connected to the user device to a network device, the device control method including obtaining device information regarding the first peripheral device, wherein the obtaining is performed by the user device; establishing communication with the network device, wherein the establishing is performed by the user device; and transmitting the device information regarding the first peripheral device to the network device based on a connection between the user device and the network device, wherein the transmitting is performed by the user device, wherein the device information includes information for recognizing the first peripheral device.

The device information further includes uniform resource locator (URL) information for downloading an application for controlling the first peripheral device.

The device control method further includes receiving a control instruction for controlling the first peripheral device from a second peripheral device connected to the network device; and controlling the first peripheral device based on the received control instruction.

The transmitting of the device information to the network device includes receiving a request for transmitting the device information; and transmitting the device information to the network device, wherein the transmitting is performed by the user device.

The obtaining of the device information includes if the request is received, requesting the first peripheral device connected to the network device for the device information; and receiving the device information from the first peripheral device.

In the transmitting of the device information, the user device transmits connection information regarding the network device, so that the first peripheral device transmits the device information to the network device.

The device control method further includes receiving information regarding recommended services in relation to the device information from the network device; and displaying the information regarding the recommended services.

The device control method further includes receiving the device information from the network device, wherein the receiving is performed by the user device; and if the user device is connected to another network device, transmitting the device information to the other network device, wherein the transmitting is performed by the user device.

According to another aspect, there is provided a device control method for controlling a device in a system including a user device and a peripheral device and a network device connected to the user device, the device control method including obtaining device information regarding the first peripheral device, wherein the obtaining is performed by the user device; transmitting the device information regarding the first peripheral device to the network device, wherein the transmitting is performed by the user device; storing the device information, wherein the storing is performed by the network device; and controlling the first peripheral device by using the device information, wherein the controlling is performed by the network device, wherein the device information includes information for recognizing the first peripheral device.

The device information further includes a uniform resource locator (URL) information for downloading an application for controlling the first peripheral device. The device control method further includes downloading and installing the application based on the URL information, wherein the downloading and the installing are performed by the network device.

The controlling of the first peripheral device includes transmitting a control instruction for controlling the first peripheral device to the user device, wherein the transmitting is performed by the second peripheral device; and controlling the first peripheral device based on the control instruction, wherein the controlling is performed by the user device.

The device control method further includes if the network device is connected to the user device, receiving the user device to transmit the device information, wherein the receiving is performed by the network device; and transmitting the device information to the network device in response to the request, wherein the transmitting is performed by the user device.

The device control method further includes transmitting connection information regarding the network device to the first peripheral device, wherein the transmitting is performed by the user device; and transmitting the device information to the network device based on the connection information regarding the network device, wherein the transmitting is performed by the first peripheral device.

The device control method further includes transmitting information regarding recommended services in relation to the device information to the user device, wherein the transmitting is performed by the network device.

The device control method further includes receives the device information from the network device, wherein the receiving is performed by the user device; and, if the user device is connected to another network device, transmitting the device information to the other network device, wherein the transmitting is performed by the user device, wherein the other network device controls peripheral devices connected to the other network device by using the device information.

According to another aspect, there is provided a device control method by which a network device registers a first peripheral device connected to a user device, the device control method including receiving device information regarding the first peripheral device based on a connection to the user device; storing the device information in the network device; and transmitting the device information to a second peripheral device connected to the network device, wherein the device information includes information for recognizing the first peripheral device.

The device information further includes uniform resource locator (URL) information for downloading an application for controlling the first peripheral device. The device control method further includes downloading and installing the application based on the URL information.

The receiving of the device information regarding the first peripheral device from the user device includes, if the network device is connected to the user device, requesting the user device for the device information, wherein the requesting is performed by the network device; and receiving the device information regarding the first peripheral device from the user device, wherein the receiving is performed by the network device.

The receiving of the device information includes receiving a connection request from the first peripheral device; connecting to the first peripheral device in response to the request; and receiving the device information from the first peripheral device.

The device control method further includes transmitting information regarding recommended services in relation to the device information to the user device.

According to another aspect, there is provided a device control method for controlling a device in a system including a user device, a first network device, and a second network device connected to the user device, the device control method including obtaining device information regarding at least one of peripheral devices stored in the first network device, wherein the obtaining is performed by the user device; connecting to the second network device, wherein the connecting is performed by the user device; and transmitting the device information to the second network device, wherein the transmitting is performed by the user device, wherein the device information is information for recognizing a peripheral device connected to the first network device.

The device information including connection information regarding the first network device, and the device control method further includes connecting to the first network device by using the connection information, wherein the connecting to the first network device is performed by the second network device; and transmitting a control command to the at least one of peripheral devices via the second network device and the first network device, wherein the transmitting the control command is performed by a peripheral device connected to the second network device.

According to another aspect, there is provided a device control method by which a second network device registers a first peripheral device connected to a first network device, the device control method including receiving device information regarding the first peripheral device from a user device; storing the device information in the second network device; and transmitting the stored device information to a second peripheral device connected to the second network device, wherein the device information includes information for recognizing the first peripheral device.

According to another aspect, there is provided a device control method by which a user device register a peripheral device connected to the user device to a network device, the device control method including obtaining device information regarding the at least one from among peripheral devices stored in a first network device, wherein the obtaining is performed by the user device; connecting to a second network device, wherein the connecting is performed by the user device; and transmitting the device information to second network device, wherein the transmitting is performed by the user device, wherein the device information is information for recognizing the first peripheral device connected to the first network device.

The device control method further includes receiving connection information regarding a device corresponding to the device information from among the peripheral devices connected to the second network device from the second network device, wherein the user device is connected to the device corresponding to the device information based on the connection information and controls the device corresponding to the device information.

According to another aspect, there is provided a device control method for controlling a device in a system including a user device, a first network device, and a second network device connected to the user device, the device control method including obtaining device information regarding the at least one from among peripheral devices stored in the first network device, wherein the obtaining is performed by the user device; connecting to the second network device, wherein the connecting is performed by the user device; transmitting the device information to the second network device, wherein the transmitting is performed by the user device; controlling a peripheral device connected to the second network device, wherein the controlling is performed by the second network device, wherein the device information is information for recognizing the peripheral device connected to the first network device.

The device information includes information regarding current status of the peripheral device connected to the first network device, and, in the controlling of the peripheral device connected to the second network device, the peripheral device connected to the second network device is controlled based on the information regarding a current status of the peripheral device.

According to another aspect, there is provided a device control system including a user device, which obtains device information regarding a first peripheral device and transmits the device information to a network device; the network device, which stores the device information received from the user device and transmits the device information to a second peripheral device; and the second peripheral device, which controls the first peripheral device by using the device information stored in the network device, wherein the device information includes information for recognizing the first peripheral device.

According to another aspect, there is provided a network device for registering a peripheral device, the network device including a communication unit, which receives device information regarding a first peripheral device connected to a user device based on a connection between the user device and the network device and transmits the device information to a second peripheral device connected to the network device; a control unit, which recognizes the second peripheral device and determines whether to transmit the device information; and a storage unit, which stores the device information, wherein the device information includes information for recognizing the first peripheral device.

According to another aspect, there is provided a user device for registering a first peripheral device connected to the user device to a network device, the user device including a device information obtaining unit, which obtains device information regarding the first peripheral device; and a communication unit, which establishes communication with the network device and transmits the device information regarding the first peripheral device to the network device based on a connection between the user device and the network device, wherein the device information includes information for recognizing the first peripheral device.

According to another aspect, there is provided a device control system including a user device, which obtains device information regarding a first peripheral device connected to the user device and transmits the device information regarding the first peripheral device to a network device; and the network device, which stores the device information and controls the first peripheral device by using the device information stored in the network device, wherein the device information includes information for recognizing the first peripheral device.

According to another aspect, there is provided a network device for registering a peripheral device, the network device including a communication unit, which receives device information regarding a first peripheral device based on a connection between the user device and the network device; a storage unit, which stores the device information; and a control unit, which controls the first peripheral device, wherein the device information includes information for recognizing the first peripheral device.

According to another aspect, there is provided a user device capable of establishing communication with a first network device and a second network device, the user device including a device information obtaining unit, which obtains device information regarding at least one from among peripheral devices connected to the first network device; and a communication unit, which establishes communication with the second network device and transmits the received device information to the second network device, wherein the device information includes information for recognizing the first peripheral device.

According to another aspect, there is provided a second network device for registering a first peripheral device, the second network device including a communication unit, which receives device information stored in a first network device from a user device and transmits the received device information to a second peripheral device connected to the second network device; and a storage unit, which stores the device information in the second network device, wherein the device information includes information for recognizing the first peripheral device.

According to another aspect, there is provided a device control system including a user device, which obtains device information regarding at least one from among peripheral devices stored in the first network device and, as the user device is connected to a second network device, transmits the device information to the second network device; and the second network device, which controls a peripheral device connected to the second network device based on the device information, wherein the device information includes information for recognizing the peripheral device connected to the first network device.

In another exemplary embodiment it is disclosed a computer readable recording medium having recorded thereon a computer program for implementing a method that may include: obtaining device information regarding a first peripheral device, wherein the obtaining is performed by an user device; establishing communication with a network device, wherein the establishing is performed by the user device; and transmitting the device information regarding the first peripheral device to the network device from the user device, wherein the transmitting is performed by the user device. The device information may include information for recognizing or identifying the first peripheral device.

In another exemplary embodiment it is disclosed a computer readable recording medium having recorded thereon a computer program for implementing a method that may include: receiving device information regarding a first peripheral device from a user device; storing the device information in a second network device; and transmitting the stored device information to a second peripheral device connected to the second network device. The device information may include information for recognizing the first peripheral device.

In another exemplary embodiment it is disclosed a computer readable recording medium having recorded thereon a computer program for implementing a method that may include: obtaining device information regarding a first peripheral device among one or more peripheral devices, the device information being stored in a first network device, wherein the obtaining is performed by an user device; connecting to a second network device, wherein the connecting is performed by the user device; and transmitting the device information to the second network device, wherein the transmitting is performed by the user device. The device information may be information for recognizing the first peripheral device connected to the first network device.

The foregoing general description and the following detailed description are only exemplary and explanatory and they are intended to provide further explanation of the invention as claimed.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart showing a process in which a device control system registers a peripheral device to the network device, according to an exemplary embodiment;

FIG. 3 is a flowchart showing a process in which the user device registers the peripheral device to the network device, according to an exemplary embodiment;

FIG. 5 is a diagram showing a process for registering the peripheral device to the network device, according to an exemplary embodiment;

FIG. 35 is a diagram showing device information according to an exemplary embodiment.

DETAILED DESCRIPTION

Figure 1:
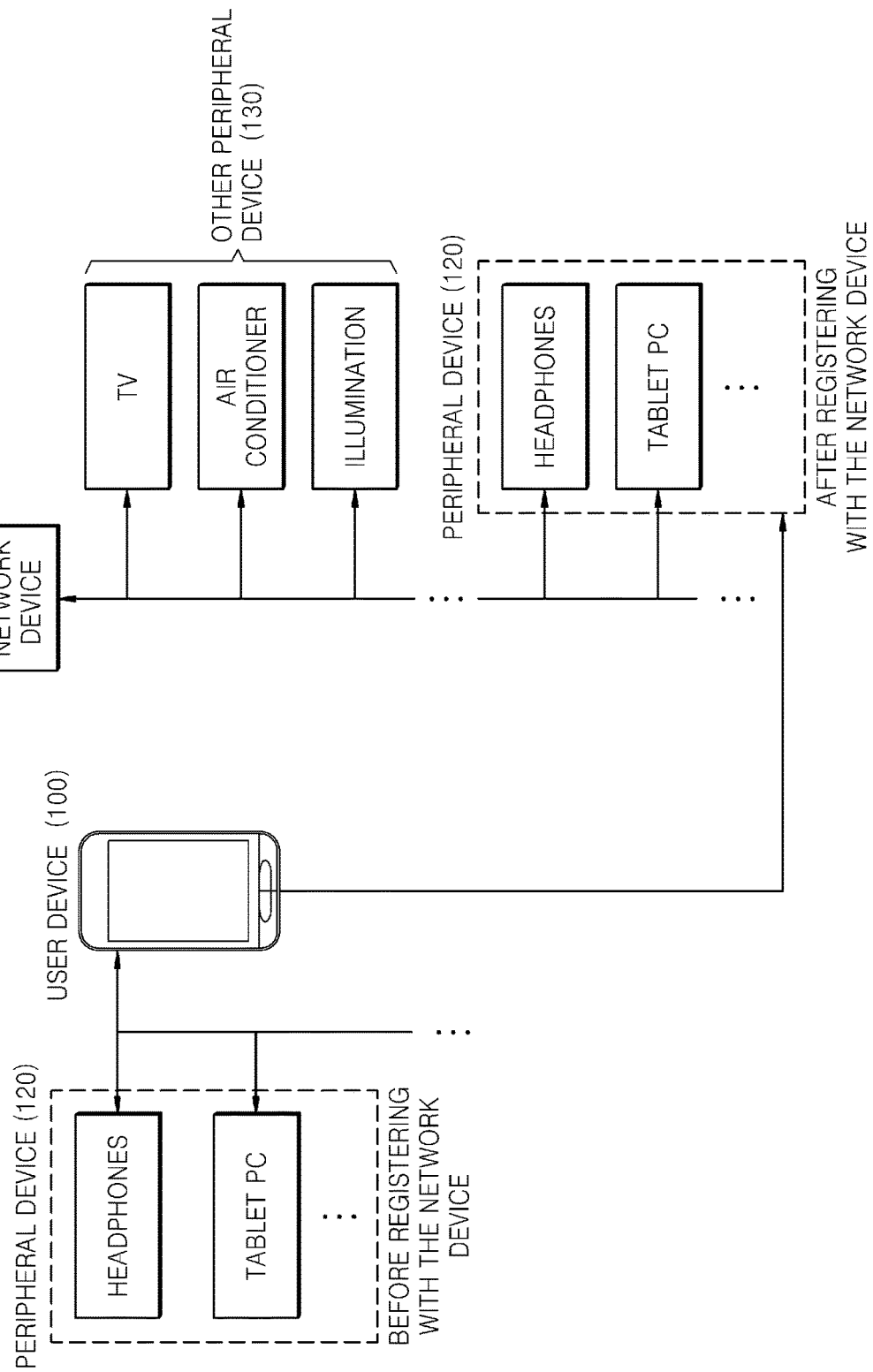
FIG. 1 is a diagram showing a structure for registering a peripheral device to a network device, according to an exemplary embodiment.

Expressions such as "at least one of," when preceding a list of elements, modify the entire list of elements and do not modify the individual elements of the list.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the description of the present invention, if it is determined that a detailed description of commonly-used technologies or structures related to the invention may unnecessarily obscure the subject matter of the invention, the detailed description will be omitted. Like reference numerals in the drawings denote like elements, and thus their description will be omitted.

It will be understood that when an element is referred to as being "connected to" another element, the element or layer can be directly connected to another element or electrically connected via intervening elements. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, it will be understood that when an element is referred to as being "connected to" another element, it can be directly connected to the other element, or intervening elements may be present.

Although some features may be described with respect to individual exemplary embodiments, aspects need not be limited thereto such that features from one or more exemplary embodiments may be combinable with other features from one or more exemplary embodiments.

The aspects of the invention in this application are not limited to the disclosed operations and sequence of operations. For instance, operations may be performed by various elements and components, may be consolidated, may be omitted, and may be altered without departing from the spirit and scope of the present invention.

Hereinafter, the present invention will be described in detail by explaining preferred embodiments of the invention with reference to the attached drawings.

FIG. 1 is a diagram showing a structure for registering a peripheral device 120 to a network device 110, according to an exemplary embodiment.

A user device 100 refers to an electronic device capable of transmitting and receiving data via wired or wireless communication with another device. For example, the user device 100 may include a smart phone, a tablet personal computer (PC), a personal digital assistant (PDA), a gateway, and various other communication devices.

The user device 100 may be connected to at least one peripheral device 120. Here, the user device 100 may be connected to the peripheral device 120 via any of various communication methods. For example, the user device 100 may be connected to the peripheral device 120 via close-distance wireless communication, such as the Wi-Fi or BLUETOOTH® wireless communication standard, or may be connected to the peripheral device 120 by wire via a communication cable.

Here, a first device being connected to a second device means that the first device becomes capable of performing data communication with the second device. For example, if a first device is connected to a second device via BLUETOOTH® wireless communication, the first device being connected to the second device may mean that the first device performs pairing with the second device and the first device and the second device become capable of performing communication therebetween by inputting a password therefor.

According to an exemplary embodiment, the user device 101 may obtain device information regarding the connected peripheral device 120. Here, the device information may include information for recognizing the peripheral device 120. According to another embodiment, the device information may include at least one of information for recognizing the peripheral device 120, information for connecting to the peripheral device 120, information for controlling the peripheral device 120, and information for checking a status of the peripheral device 120.

For example, the device information may include a name of the peripheral device 120, a group to which the peripheral device 120 belongs, communication networks supported by the peripheral device 120, an internet protocol (IP) address, a media access control (MAC) address, and a current status of the peripheral device 120.

According to an exemplary embodiment, the user device 100 may obtain information for connecting to and controlling the peripheral device 120 as device information. For example, service set identification (SSID) and an access password of the peripheral device 120, which may be obtained when the user device 100 is connected to the peripheral device 120, may be obtained as device information.

Furthermore, according to another exemplary embodiment, the user device 100 may request the peripheral device 120 to transmit device information thereof via a connection to the peripheral device 120. The peripheral device 120 may transmit device information regarding the peripheral device 120 to the user device 100 in response to the request.

According to an exemplary embodiment, the user device 100 may register the obtained device information regarding the peripheral device 120 to the network device 110. Here, registration of the peripheral device 120 to the network device 110 refers to storing device information regarding the peripheral device 120 in the network device 110. The device information may be stored not only in an internal memory arranged at the network device 110, but also in an external memory or an external server connected to the network device 110. Element 120(b) in FIG. 1 shows the peripheral device 120 after the peripheral device 120 is registered to the network device 110.

Here, the network device 110 refers to a device which is capable of performing wired or wireless communication with other devices and storing data. Here, it is not necessary to store data in the network device 110, and the network device 110 may store data in an external device.

The network device 110 may establish communications with other devices, thereby forming a network having a variable topology. For example, when the network device 110 is connected to another peripheral device 130, the network device 110 may register the peripheral device 120 and may be connected to the peripheral device 120, thereby forming a network having a connection structure in which the network device 110, the peripheral device 120, and the peripheral device 130 are connected.

Furthermore, the term topology refers to a connection form or a connection structure between devices. A topology may include a physical topology and a logical topology, where a topology may be determined based on physical or logical connections between devices belonging to a topology structure. For example, a topology may be distinguished from another topology based on at least one from among a connection relationship between devices, connection methods between devices, data transmission rates between devices, data flow between devices, and types of applications installed on devices. However, the present invention is not limited thereto.

Furthermore, the user device 100, the network device 110, the peripheral device 120, and the other peripheral device 130 constituting a topology may be determined based on locations of devices and a role of each device with respect to other devices in a topology structure. Therefore, a corresponding device may function as at least one from among the user device 100, the network device 110, the peripheral device 120, and the other peripheral device 130.

The peripheral device 120 and the other peripheral device 130 are devices providing functions for executing services in connection with other devices. Furthermore, the peripheral device 120 and the other peripheral device 130 may autonomously control other devices to provide services or may operate under control instructions received from other devices. For example, the peripheral device 120 and the other peripheral device 130 may include passive devices, such as headphones and earphones, and active devices, such as smart phones or tablet PCs.

FIG. 2 is a flowchart showing a process in which a device control system registers a peripheral device to the network device 110, according to an exemplary embodiment.

First, the user device 100 obtains device information regarding the peripheral device 120 connected to the user device 100 (operation S210).

Here, as the peripheral device 120 is connected, the user device 100 may execute an application for registering the peripheral device 120 to the network device 110. Here, if no application for registering the peripheral device 120 to the network device 110 is installed, the user device 100 may download and install a corresponding application.

Here, according to an exemplary embodiment, the user device 100 may cumulatively store device information regarding the peripheral device 120. For example, the user device 100 may store time points and number of times that the user device 100 is connected to the peripheral device 120.

Furthermore, the user device 100 may obtain device information every time the user device 100 is connected to the peripheral device 120. Alternatively, the user device 100 may periodically obtain device information at a corresponding time interval or may obtain device information when a request for transmitting device information is received from the network device 110. A time when the user device 100 obtains device information may vary according to exemplary embodiments.

Next, the user device 100 may transmit device information regarding the peripheral device 120 to the network device 110 (operation S220). The network device 110 may receive the device information regarding the peripheral device 120 and store the received device information (operation S230).

The network device 110 may send information to the other peripheral device 130 regarding the peripheral device 120. The other peripheral device 130 connected to the network device 110 may control the peripheral device 120 by using the device information stored in the network device 110 (operation S240).

Here, the other peripheral device 130 may execute an application for controlling the peripheral device 120. Here, if no application for controlling the peripheral device 120 is installed on the other peripheral device 130, the other peripheral device 130 may download and install a corresponding application for controlling the peripheral device 120.

According to an exemplary embodiment, device information may include information regarding a uniform resource locator (URL) for downloading an application for controlling the peripheral device 120. Information regarding a URL included in device information may indicate a location of a file for installing an application for controlling the peripheral device 120. The other peripheral device 130 may download an application for controlling the peripheral device 120 by using information regarding a URL included in device information.

Furthermore, according to another exemplary embodiment, the network device 110 may transmit information regarding recommended services related to device information to the user device 100 based on received device information. For example, if device information relates to a game controller, the network device 110 may transmit information regarding related game contents to the user device 100.

Furthermore, according to another exemplary embodiment, the user device 100 may receive device information from the network device 110. Next, as the user device 100 is connected to a second network device, the user device 100 may transmit the device information received from the network device 110 to the second network device. Here, the second network device may control a peripheral device connected to the second network device by using the received device information. For example, if an illumination device connected to the network device 110 was turned on and a television connected to the network device 110 was turned off when the user device 100 was connected to the network device 110, an illumination device connected to the second network device may be turned on and a television connected to the second network device may be turned off as the user device 100 is connected to the second network device.

Furthermore, according to an exemplary embodiment, not only the other peripheral device 130, but also the network device 110 may also execute an application for controlling the peripheral device 120 and control the peripheral device 120.

Here, when a first device controls a second device, the first device not only makes the second device perform an action by transmitting a control instruction to the second device, but also receives a control instruction from the second device and performs a corresponding action. In other words, control instructions may be not only transmitted unilaterally from one device to another, but may also be exchanged between two devices.

FIG. 3 is a flowchart showing a process in which the user device 100 registers the peripheral device 120 to the network device 110, according to an exemplary embodiment.

First, the user device 100 may be connected to the peripheral device 120 (operation S310). Here, the user device 100 may be connected to the peripheral device 120 via any of various communication methods. For example, the user device 100 may be connected to the peripheral device 120 via close-distance wireless communication, such as the Wi-Fi or BLUETOOTH® wireless communication standard, or may be connected to the peripheral device 120 by wire via a communication cable.

Next, as the user device 100 is connected to the peripheral device 120, the user device 100 may execute an application for registering the peripheral device 120 to the network device 110 (operation S320). Here, if no application for registering the peripheral device 120 to the network device 110 is installed, the user device 100 may download and install a corresponding application for registering the peripheral device 120 to the network device 110.

Next, the user device 100 may obtain device information regarding the peripheral device 120 from the peripheral device 120 via the executed application (operation S330). The obtained device information regarding the peripheral device 120 may be transmitted to the network device 110 connected to the user device 100 (operation S340).

Here, according to an exemplary embodiment, if the user device 100 detects a connection to the network device 110, the user device 100 may transmit the device information to the network device 110. In this case, the user device 100 may transmit device information to the network device 110 only if the user device 100 has been previously connected to the network device 110. Since device information is only transmitted to the network device 110 to which the user device 100 has been previously connected, unnecessary transmission of device information may be prevented.

According to another exemplary embodiment, when device information is requested by the network device 110, the user device 100 may transmit the device information to the network device 110.

Furthermore, the user device 100 may check an intention of a user and transmit device information either by selecting the network device 110 to which the device information is to be transmitted based on a user input and transmitting the device information or by displaying a user interface (UI) asking a user whether to transmit the device information or not.

FIGS. 4A through 4D are diagrams showing the user device 100 registering the peripheral device 120 to the network device 110, according to an exemplary embodiment.

Figure 4A:
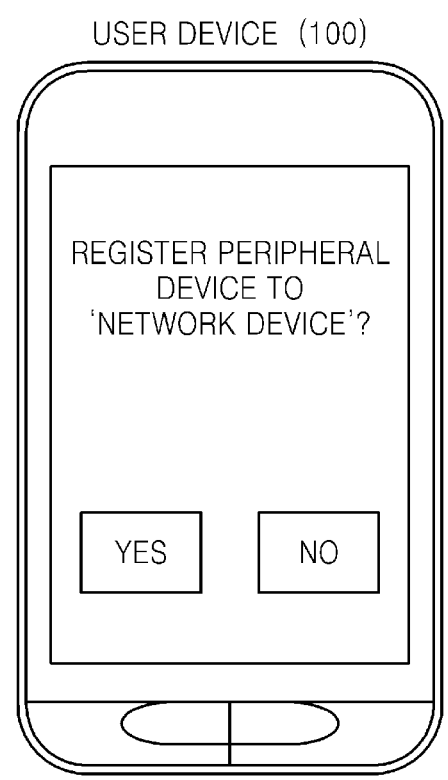
FIGS. 4A through 4D are diagrams showing the user device registering the peripheral device to the network device, according to an exemplary embodiment.

FIG. 4A is a diagram showing the user device 100 which displays a UI asking a user whether to transmit device information or not before the device information is transmitted. The user device 100 may output a UI asking a user whether to transmit device information or not before the device information is transmitted to the network device 110.

Figure 4B:
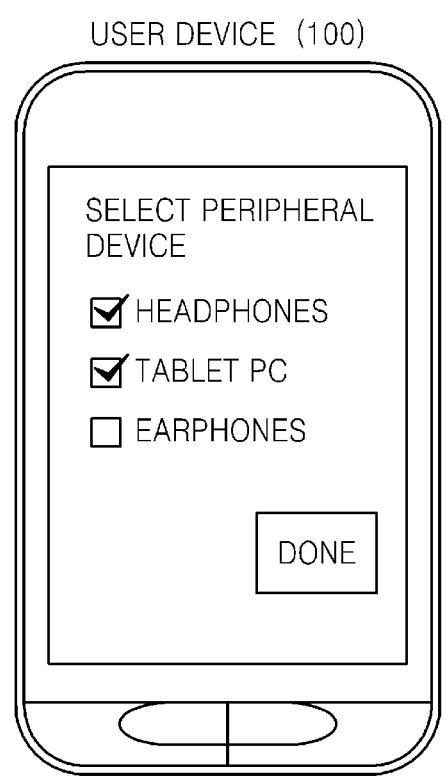

FIG. 4B is a diagram showing a UI for selecting device information to be transmitted to the network device 110 from among device information of a plurality of peripheral devices 120 connected to the user device 100. The user device 100 may display a list of the plurality of peripheral devices 120 connected to the user device 100 and may select device information regarding the peripheral device 120 to be transmitted to the network device 110 according to a user input. The user device 100 may transmit only device information of the selected peripheral device 120 to the network device 110.

FIGS. 4A and 4B merely show examples for convenience of explanation, and various modifications may be made in a UI to be displayed on the network device 110.

Figure 4C:
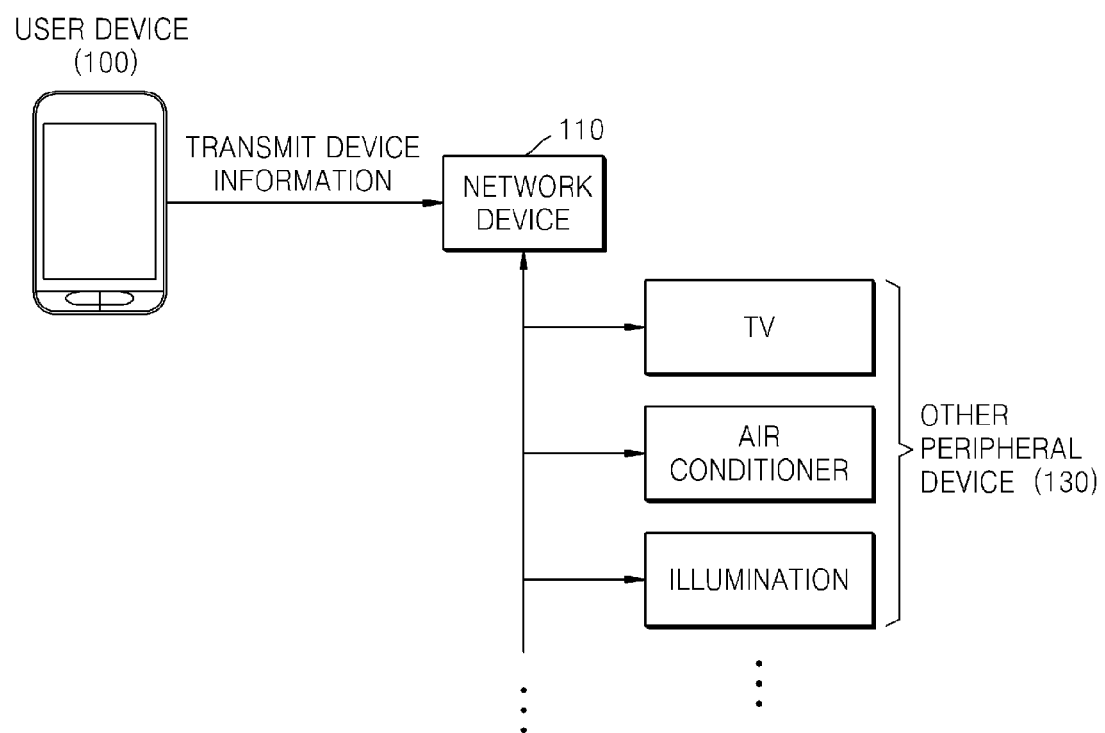

FIG. 4C is a diagram showing that the user device 100 transmits device information regarding a peripheral device 120 to the network device 110. The other peripheral device 130 may include devices previously connected to the network device 110 before the peripheral device 120 is registered and devices connected to the network device 110 after the peripheral device 120 is registered.

Figure 4D:
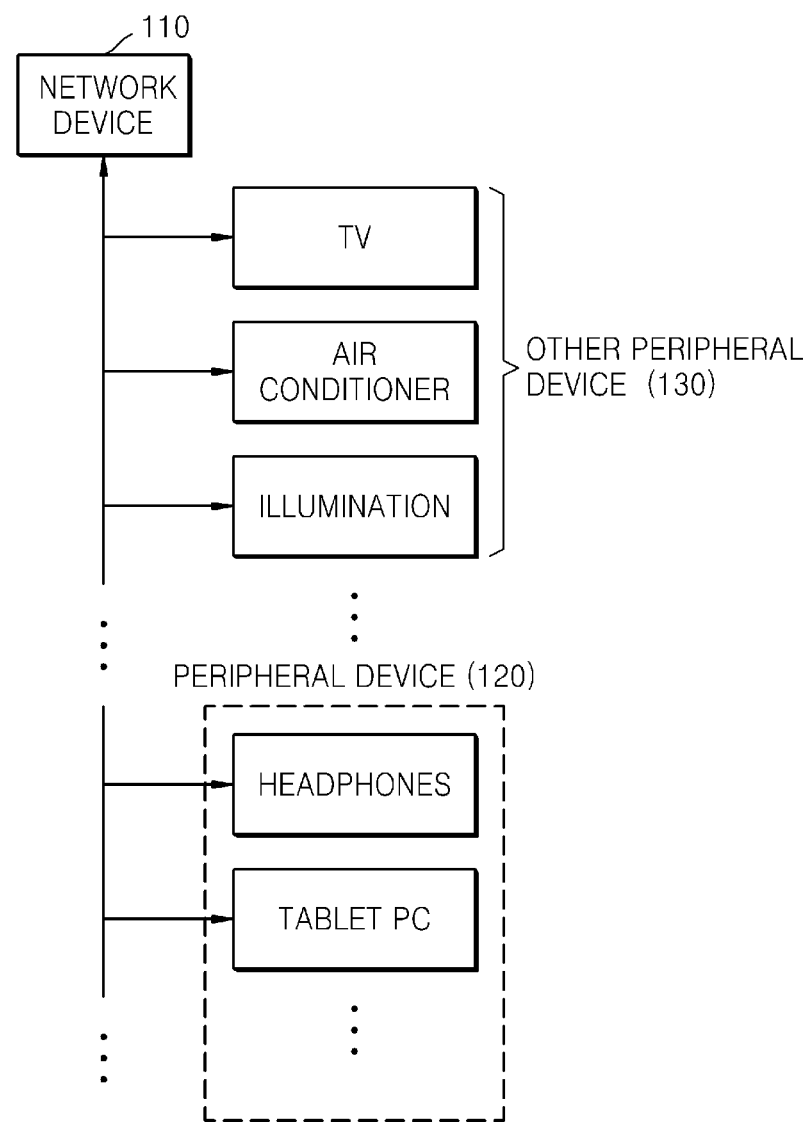

FIG. 4D is a diagram showing the structure of a device registered to the network device 110 after the peripheral device 120 is registered to the network device 110. Communication may be established between the network device 110, the peripheral device 120 registered to the network device 110, and the other peripheral device 130. The peripheral device 120 and the other peripheral device 130 may control each other by using the device information stored in the network device 110.

FIG. 5 is a diagram showing a process for registering the peripheral device 120 to the network device 110, according to an exemplary embodiment.

First, the peripheral device 120 establishes communication with the user device 100 (operation S510). As the user device 100 is connected to the peripheral device 120, the user device 100 executes an application for registering the peripheral device 120 (operation S520).

Next, the peripheral device 120 transmits device information regarding the peripheral device 120 to the user device 100 (operation S530). The user device 100 may store received device information (operation S540). Here, it is not necessary to store device information in the user device 100, and thus operation S540 may be omitted.

Next, the user device 100 is connected to the network device 110 (operation S550). As the user device 100 detects a connection to the peripheral device 120, the user device 100 transmits device information regarding the peripheral device 120 to the network device 110 (operation S560). The network device 110 stores received device information (operation S570).

Figure 6:
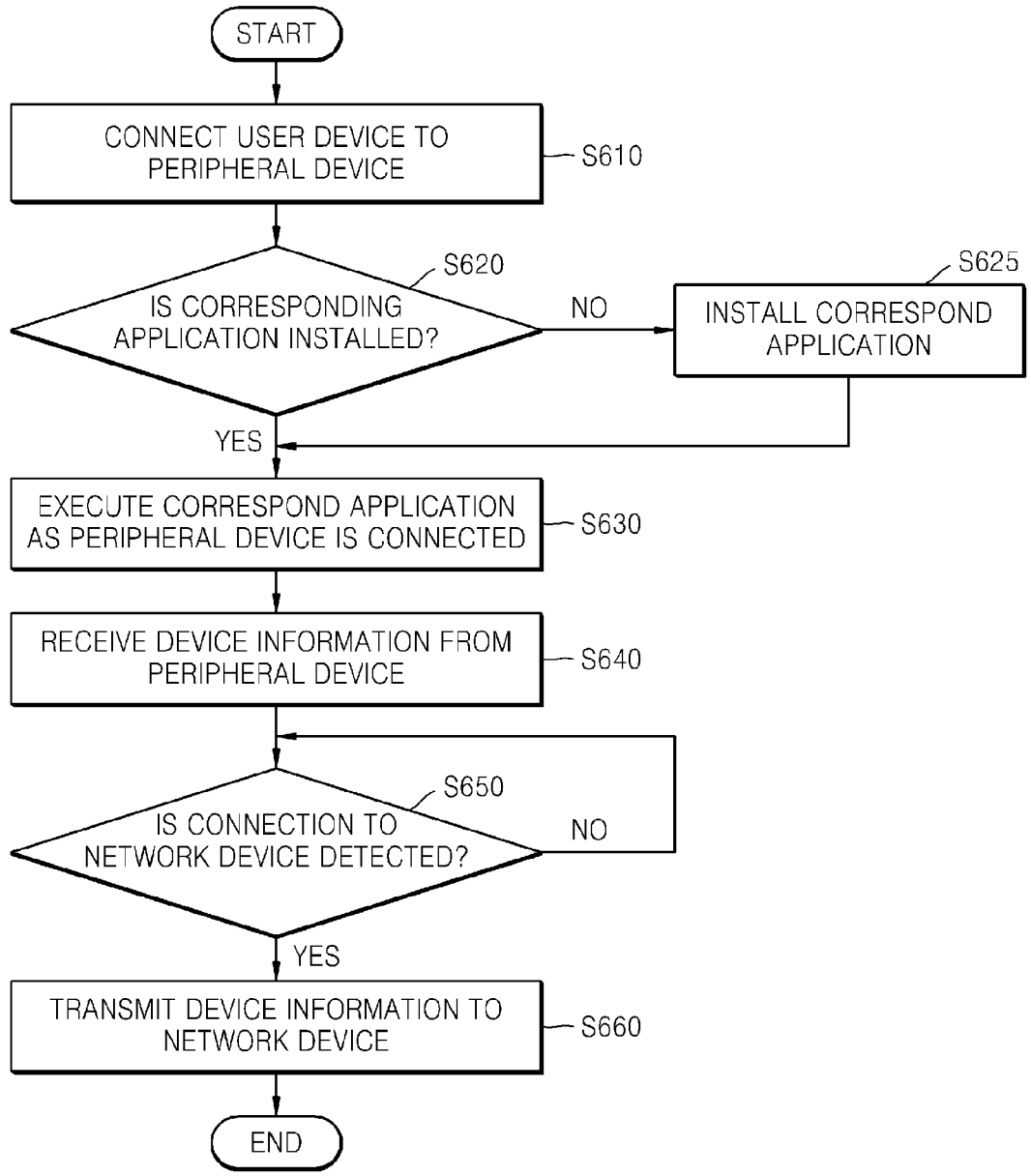
FIG. 6 is a flowchart showing a process in which the user device registers the peripheral device to the network device according to an exemplary embodiment.

FIG. 6 is a flowchart showing a process in which the user device 100 registers the peripheral device 120 to the network device 110 according to an exemplary embodiment.

First, the user device 100 is connected to the peripheral device 120 (operation S610). As the user device 100 is connected to the peripheral device 120, the user device 100 determines whether a corresponding application for registering the peripheral device 120 to the network device 110 is installed (operation S620).

If the corresponding application for registering the peripheral device 120 to the network device 110 is not installed, the user device 100 downloads and installs the corresponding application (operation S625). If the corresponding application is installed, the user device 100 executes the application (operation S630).

Next, the user device 100 may obtain device information from the peripheral device 120 by using the executed application (operation S640). Here, the user device 100 may request device information from the peripheral device 120. The user device 100 may obtain device information by receiving the device information from the peripheral device 120 in response to the request for transmitting the device information. For example, the user device 100 may request information regarding all network types supported by the peripheral device 120.

Next, if the user device 100 detects a connection to the network device 110 (operation S650), the user device 100 may transmit device information to the network device 110 (operation S660). If connection to the network is not detected the user device may periodically search for connection as shown in FIG. 6.

Figure 7:
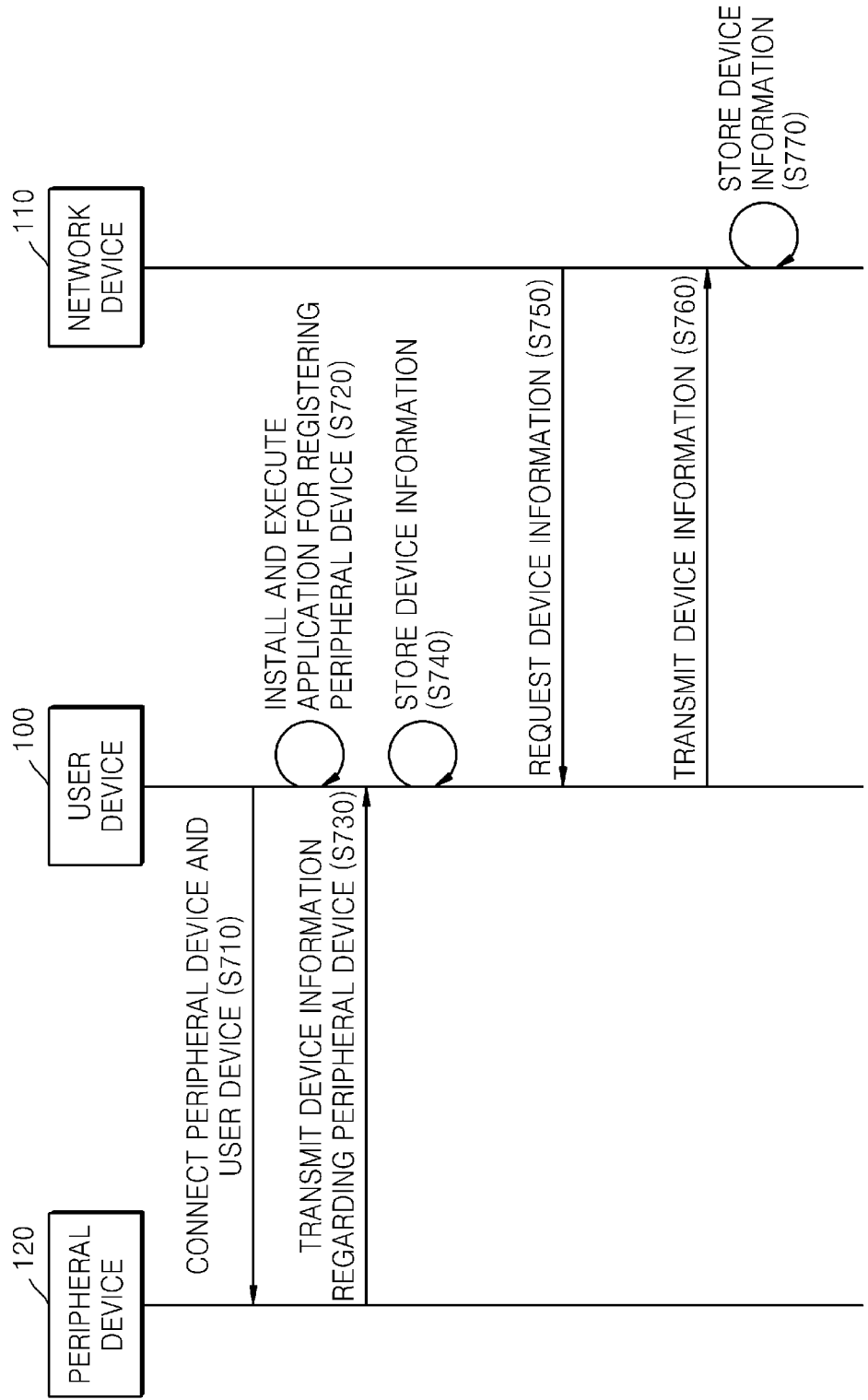
FIG. 7 is a diagram showing a process for registering the peripheral device to the network device, according to another exemplary embodiment.

FIG. 7 is a diagram showing a process for registering the peripheral device 120 to the network device 110, according to another exemplary embodiment.

First, the peripheral device 120 establishes communication with the user device 100 (operation S710). As the peripheral device 120 is connected to the user device 100, the user device 100 executes an application for registering the peripheral device 120 (operation S720).

Next, the peripheral device 120 transmits device information regarding the peripheral device 120 to the user device 100 (operation S730). The user device 100 may store received device information (operation S740). Here, it is not necessary to store device information in the user device 100, and thus operation S740 may be omitted.

Next, the network device 110 requests the user device 100 to transmit device information (operation S750). The user device 100 transmits device information regarding the peripheral device 120 to the network device 110 in response to the received request for transmitting the device information (operation S760). The peripheral device 120 stores the received device information (operation S770).

Figure 8:
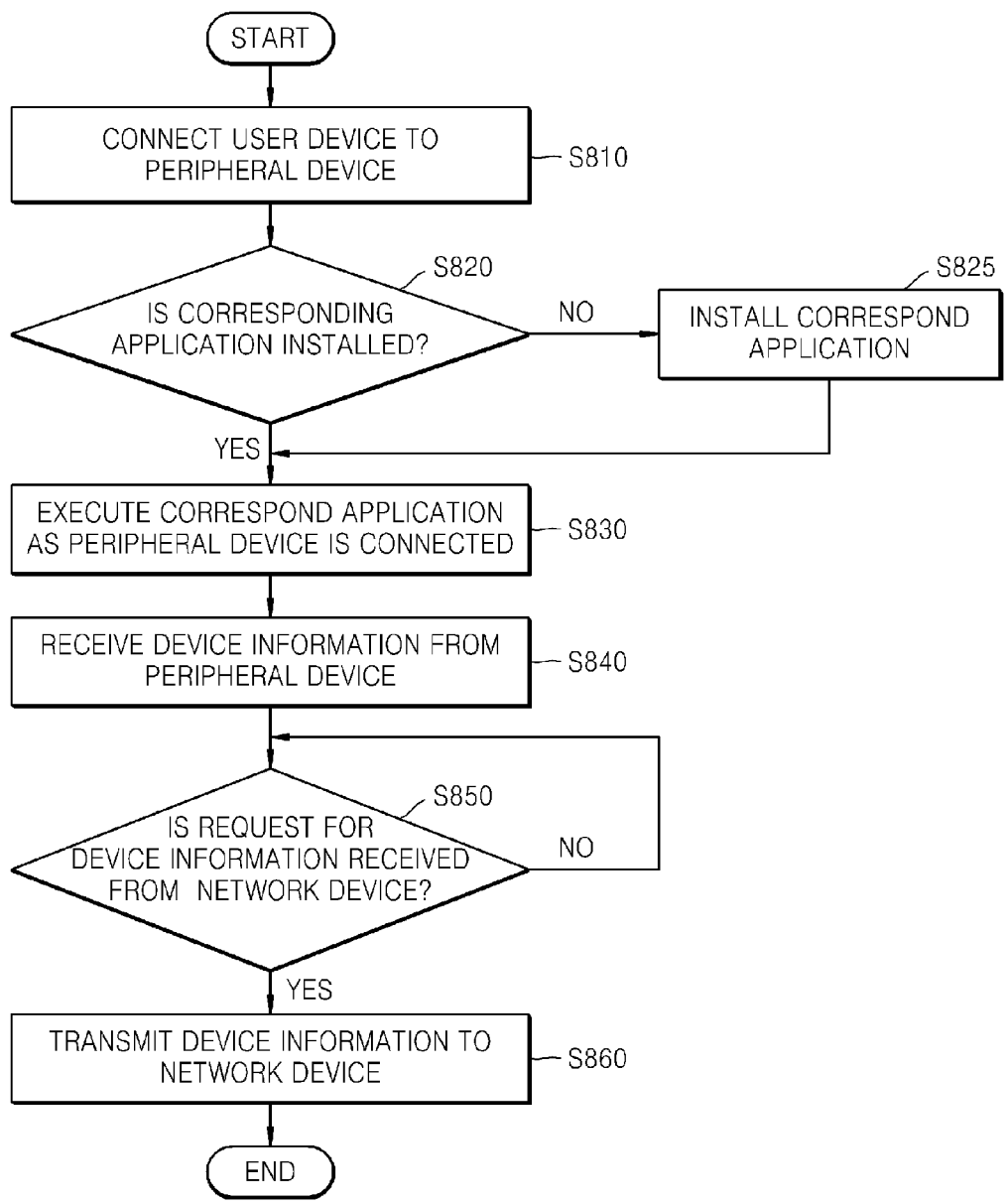
FIG. 8 is a flowchart showing a process that the user device registers the peripheral device to the network device, according to another exemplary embodiment.

FIG. 8 is a flowchart showing a process that the user device 100 registers the peripheral device 120 to the network device 110, according to another exemplary embodiment.

First, the user device 100 is connected to the peripheral device 120 (operation S810). As the user device 100 is connected to the peripheral device 120, the user device 100 determines whether a corresponding application for registering the peripheral device 120 to the network device 110 is installed (operation S820).

If the corresponding application for registering the peripheral device 120 to the network device 110 is not installed, the user device 100 downloads and installs the corresponding application (operation S825). If the corresponding application is installed, the user device 100 executes the application (operation S830).

Next, the user device 100 may obtain device information from the peripheral device 120 by using the executed application (operation S840). Here, the user device 100 may request device information at the peripheral device 120. The user device 100 may obtain device information by receiving the device information from the peripheral device 120 in response to the request for transmitting the device information.

Next, if the user device 100 receives a request for transmitting device information from the network device 110 (operation S850), the user device 100 may transmit device information to the network device 110 (operation S860).

Figure 9:
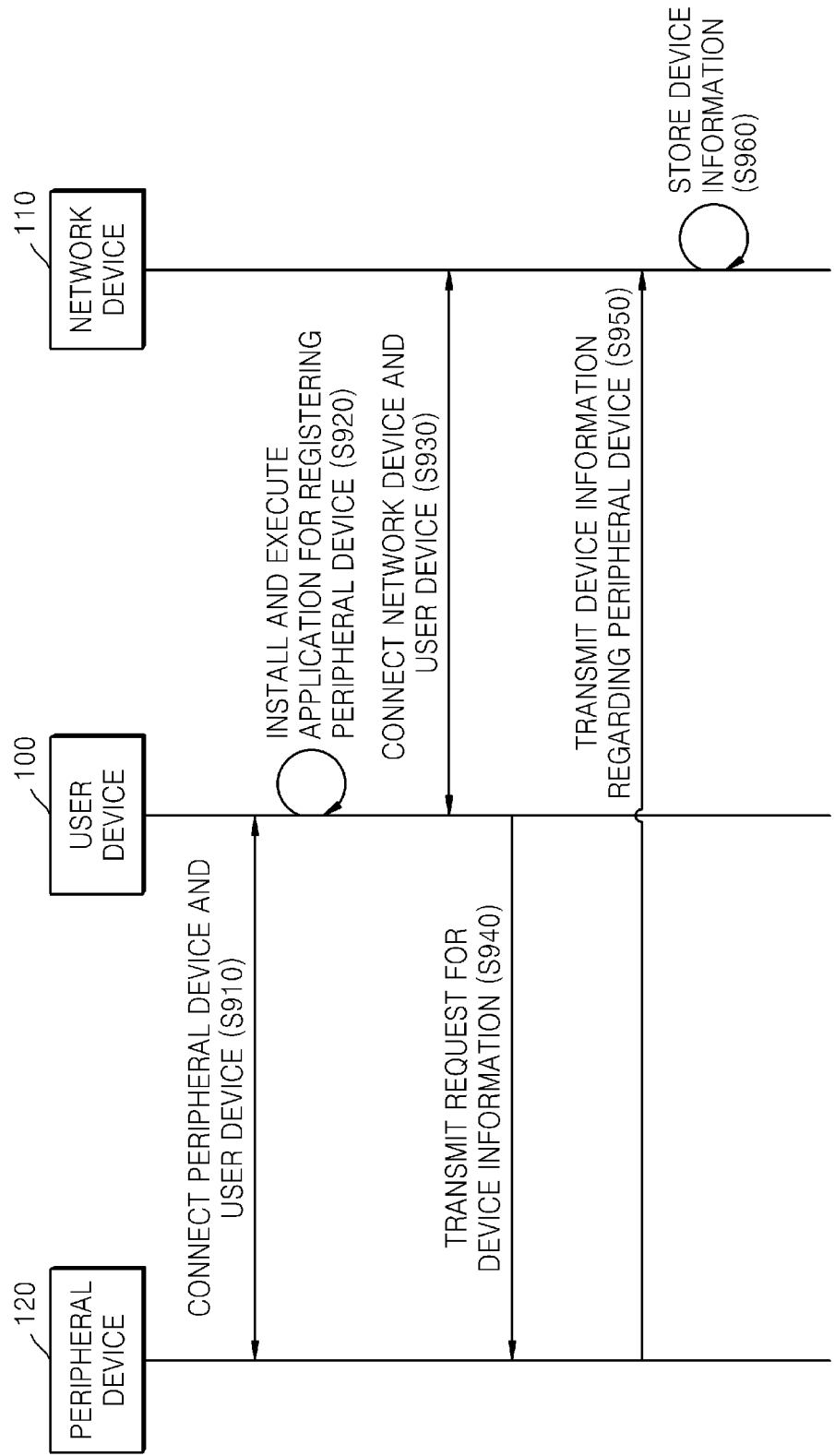
FIG. 9 is a diagram showing a process for registering the peripheral device to the network device, according to another exemplary embodiment.

FIG. 9 is a diagram showing a process for registering the peripheral device 120 to the network device 110, according to another exemplary embodiment.

First, the peripheral device 120 establishes communication with the user device 100 (operation S910). As the peripheral device 120 is connected to the user device 100, the user device 100 executes an application for registering the peripheral device 120 (operation S920).

Next, when the user device 100 is connected to the peripheral device 120 (operation S930), the user device 100 requests the peripheral device 120 to transmit device information as a connection to the network device 110 is detected (operation S940). Here, the user device 100 may request the peripheral device 120 to transmit device information together with connection information regarding the network device 110.

The peripheral device 120 may be connected to the network device 110 by using the connection information regarding the network device 110 received from the user device 100. The peripheral device 120 connected to the network device 110 may transmit device information to the network device 110 (operation S950). The network device 110 stores received device information (operation S960).

Figure 10:
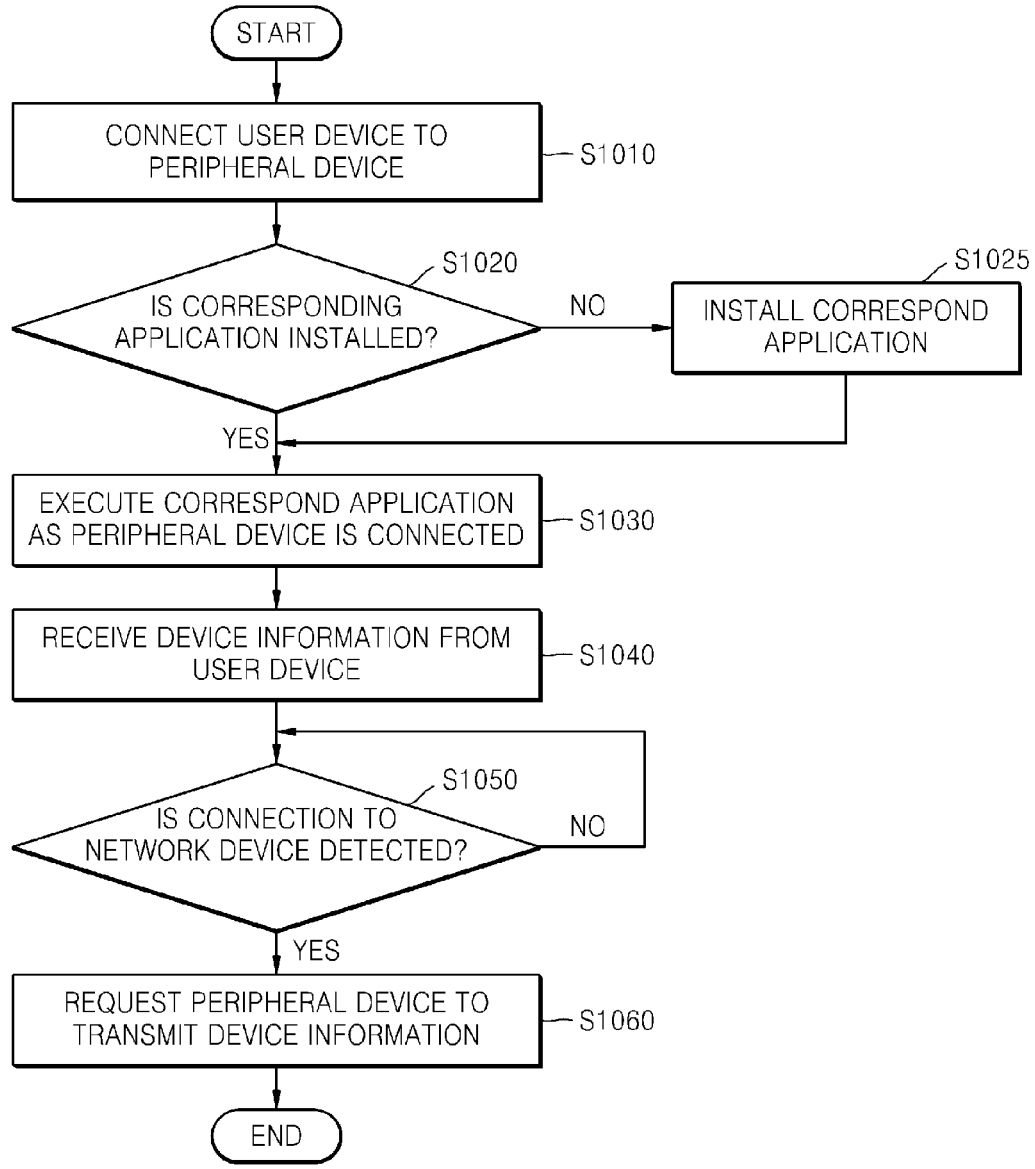
FIG. 10 is a flowchart showing a process in which the user device registers the peripheral device to the network device, according to another exemplary embodiment.

FIG. 10 is a flowchart showing a process in which the user device 100 registers the peripheral device 120 to the network device 110, according to another exemplary embodiment.

First, the user device 100 is connected to the peripheral device 120 (operation S1010). As the user device 100 is connected to the peripheral device 120, the user device 100 determines whether a corresponding application for registering the peripheral device 120 to the network device 110 is installed (operation S1020).

If the corresponding application for registering the peripheral device 120 to the network device 110 is not installed, the user device 100 downloads and installs the corresponding application (operation S1025). If the corresponding application is installed, the user device 100 executes the application (operation S1030).

Next, the user device 100 may obtain device information from the peripheral device 120 by using the executed application (operation S1040). Here, the user device 100 may request device information at the peripheral device. The user device 100 may obtain device information by receiving the device information from the peripheral device 120 in response to the request for transmitting the device information.

Next, if the user device 100 detects a connection to the network device 110 (operation S1050), the user device 100 may transmit device information to the network device 110 (operation S1060).

Figure 11:
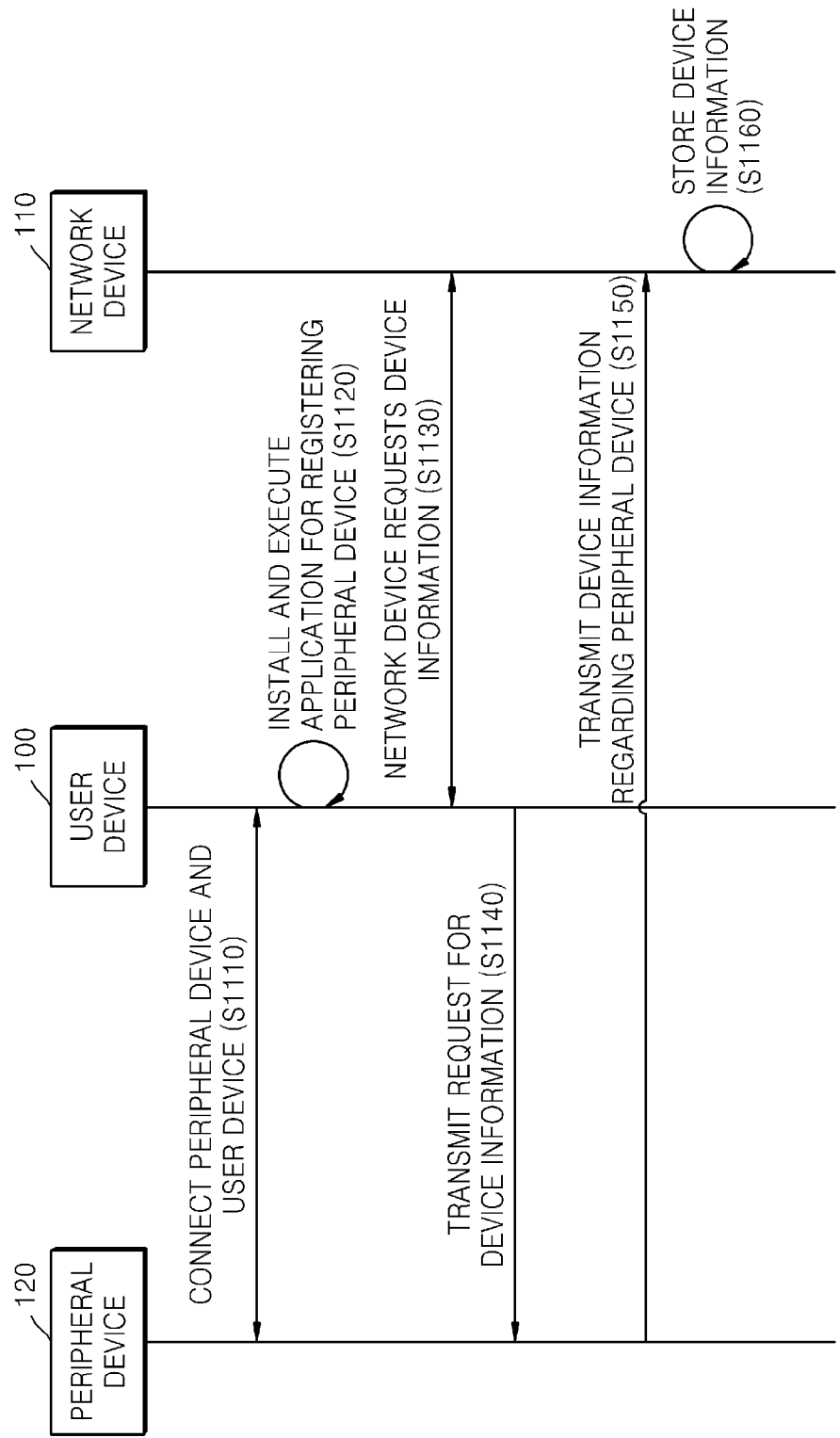
FIG. 11 is a diagram showing a process for registering the peripheral device to the network device, according to another exemplary embodiment.

FIG. 11 is a diagram showing a process for registering the peripheral device 120 to the network device 110, according to another exemplary embodiment.

First, the peripheral device 120 establishes communication with the user device 100 (operation S1110). As the peripheral device 120 is connected to the user device 100, the user device 100 executes an application for registering the peripheral device 120 (operation S1120).

Next, when network device 110 requests the user device 100 to transmit device information (operation S1130), the user device 100 requests the peripheral device 120 to transmit device information as the request from the network device 110 is received (operation S1140). Here, the user device 100 may transmit the request to the peripheral device 120 together with connection information regarding the network device 110.

The peripheral device 120 may be connected to the network device 110 by using the connection information regarding the network device 110 received from the user device 100. The peripheral device 120 connected to the network device 110 may transmit device information to the network device 110 (operation S1150). The network device 110 stores received device information (operation S1160).

Figure 12:
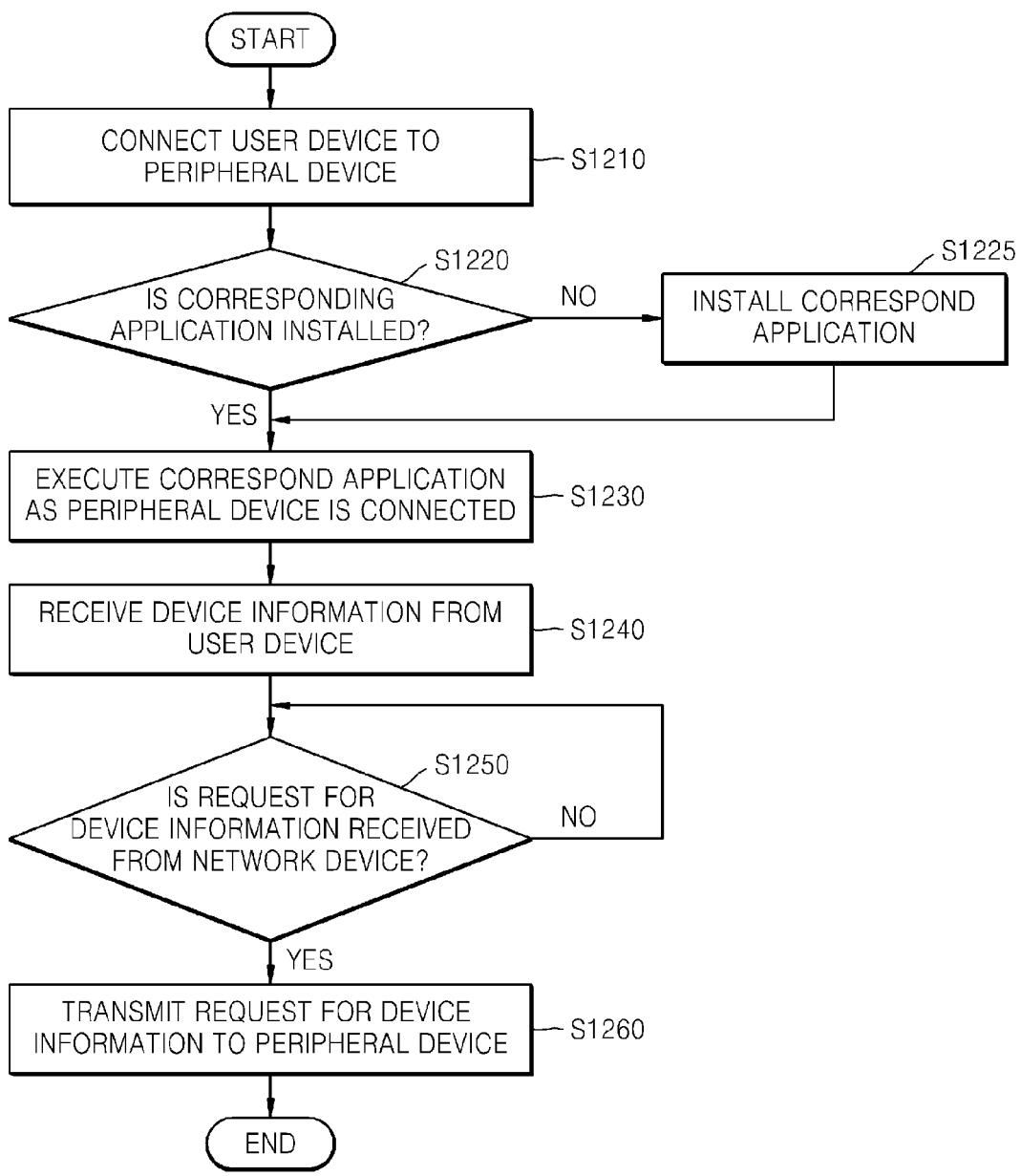
FIG. 12 is a flowchart showing a process in which the user device registers the peripheral device to the network device, according to another exemplary embodiment.

FIG. 12 is a flowchart showing a process in which the user device 100 registers the peripheral device 120 to the network device 110, according to another exemplary embodiment.

First, the user device 100 is connected to the peripheral device 120 (operation S1210). As the user device 100 is connected to the peripheral device 120, the user device 100 determines whether a corresponding application for registering the peripheral device 120 to the network device 110 is installed (operation S1220).

If the corresponding application for registering the peripheral device 120 to the network device 110 is not installed, the user device 100 downloads and installs the corresponding application (operation S1225). If the corresponding application is installed, the user device 100 executes the application (operation S1230).

Next, the user device 100 may obtain device information from the peripheral device 120 by using the executed application (operation S1240). Here, the user device 100 may request device information at the peripheral device 120. The user device 100 may obtain device information by receiving the device information from the peripheral device 120 in response to the request for transmitting the device information.

Next, if the user device 100 receives a request for transmitting device information from the network device 110 (operation S1250), the user device 100 may request the peripheral device 120 to transmit device information (operation S1260).

Figure 13:
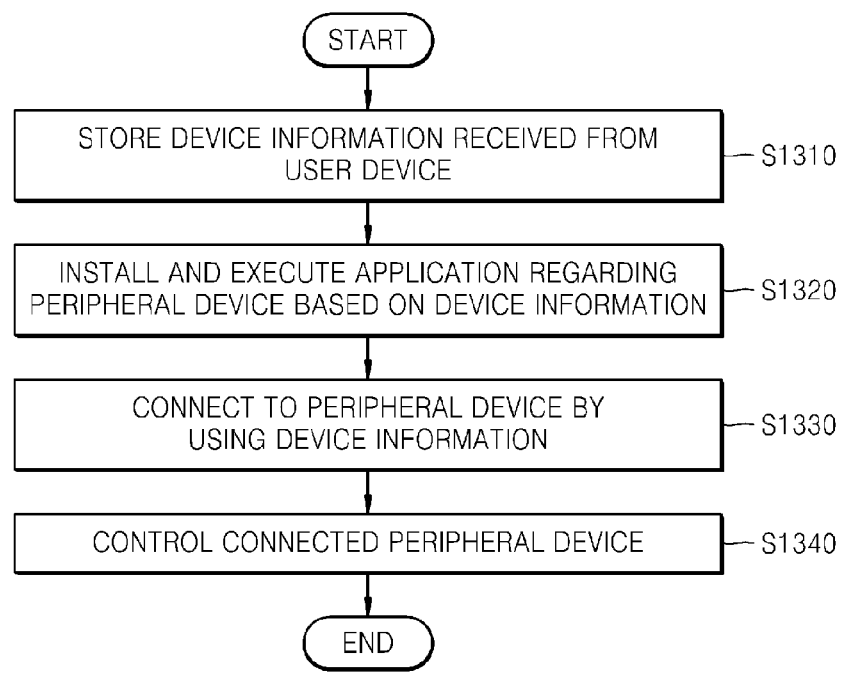
FIG. 13 is a flowchart showing that the network device registers and controls the peripheral device, according to an exemplary embodiment.

FIG. 13 is a flowchart showing that the network device 110 registers and controls the peripheral device 120, according to an exemplary embodiment.

First, the network device 110 stores device information received from the user device 100 (operation S1310). Next, the network device 110 executes an application regarding the peripheral device 120 (operation S1320). If the application regarding the peripheral device 120 is not installed, the network device 110 may download and install the application regarding the peripheral device 120.

According to an exemplary embodiment, the application regarding the peripheral device 120 may be an application for controlling the peripheral device 120. For example, if the peripheral device 120 is a television, the network device 110 to which the television is registered may recognize that the peripheral device 120 is the television based on device information and may install an application for controlling the television.

Next, the network device 110 is connected to the peripheral device 120 by using the device information. For example, the network device 110 may be connected to the peripheral device 120 via a Wi-Fi network by using a SSID, an IP address, and a Wi-Fi access password included in the device information.

Next, the network device 110 may control the connected peripheral device 120.

Figure 14:
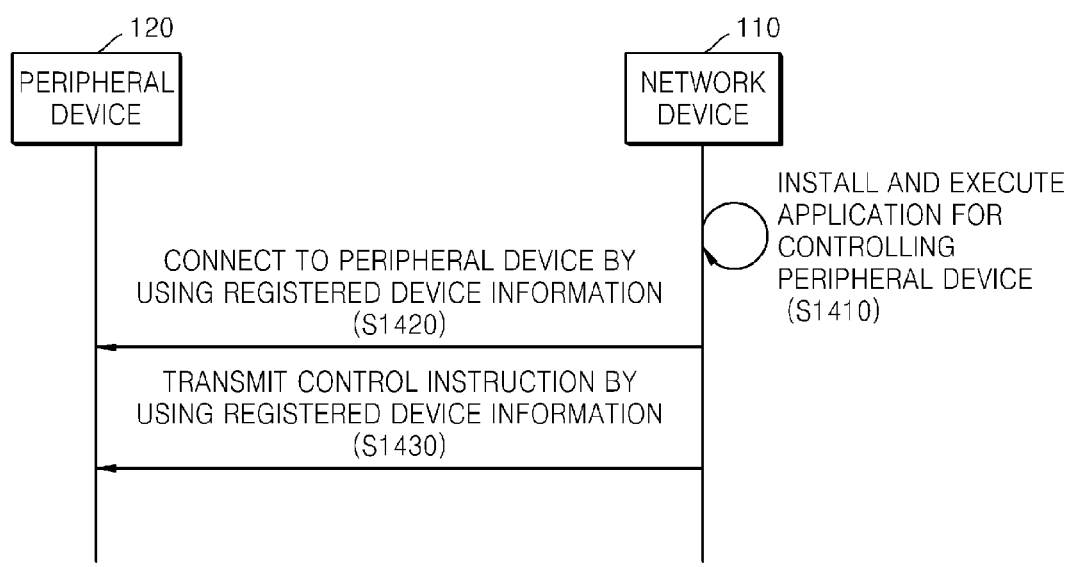
FIG. 14 is a diagram showing a process in which the network device controls the peripheral device by using device information, according to an exemplary embodiment.

FIG. 14 is a diagram showing a process in which the network device 110 controls the peripheral device 120 by using device information, according to an exemplary embodiment.

The network device 110 may execute an application for controlling the peripheral device 120 (operation S1410). Here, if the application for controlling the peripheral device 120 is not installed in the network device 110, the network device 110 may install the application. Here, the application for controlling the peripheral device 120 may be determined based on device information stored in the network device 110.

The network device 110 may be connected to the peripheral device 120 by using device information (operation S1420) and may transmit control instructions to the connected peripheral device 120 (operation S1430).

Figure 15:
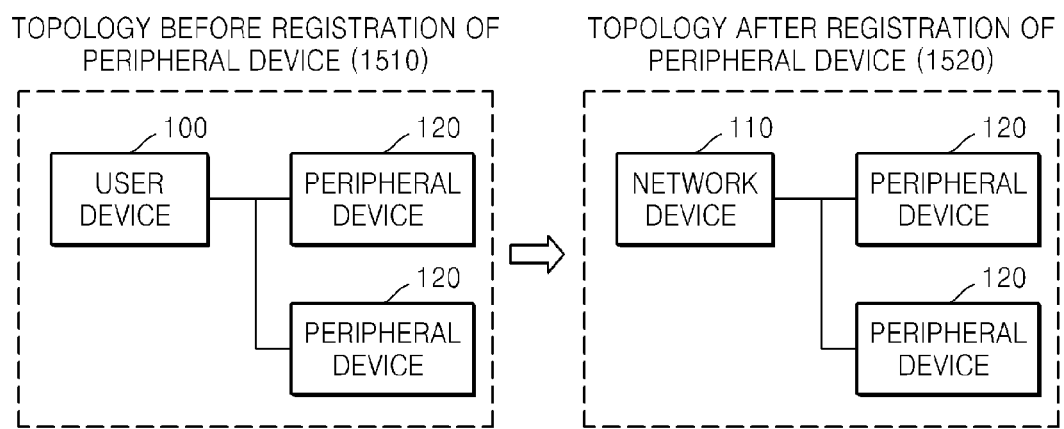
FIG. 15 is a diagram showing a change of a topology when the network device controls the peripheral device, according to an exemplary embodiment.

FIG. 15 is a diagram showing a change of a topology when the network device 110 controls the peripheral device 120, according to an exemplary embodiment.

Before the peripheral device 120 is registered to the network device 110, the peripheral device 120 is connected to the user device 100 (1510).

When the network device 110 controls the peripheral device 120 after the peripheral device 120 is registered to the network device 110 as shown in FIG. 14, the peripheral device 120 is connected to the network device 110 (1520).

Figure 16:
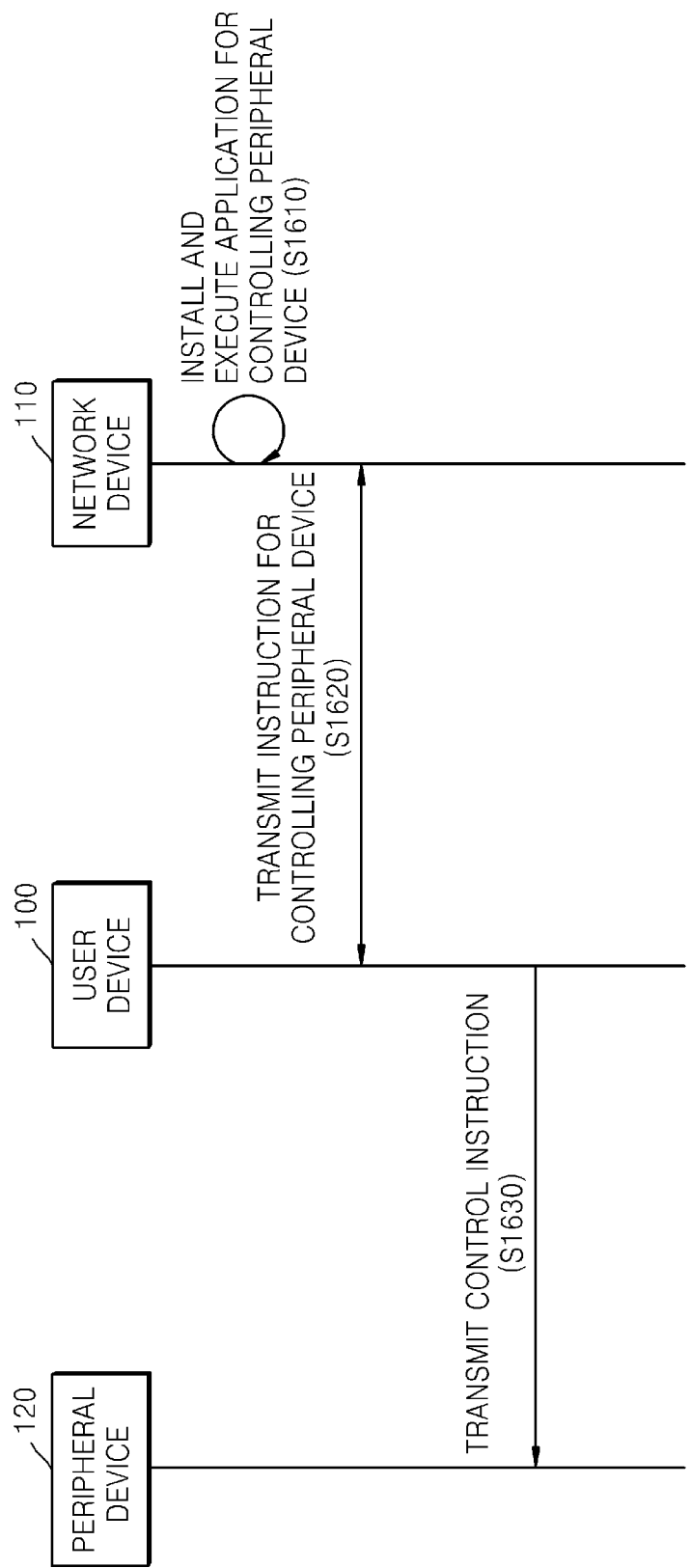
FIG. 16 is a diagram showing a process in which the network device controls the peripheral device by using device information, according to another exemplary embodiment.

FIG. 16 is a diagram showing a process in which the network device 110 controls the peripheral device 120 by using device information, according to another exemplary embodiment.

According to an exemplary embodiment, if there is no match between networks supported by the peripheral device 120 and networks supported by the network device 110, control instructions may be transmitted via the user device 100.

For example, if the peripheral device 120 only supports BLUETOOTH® communication and the network device 110 only supports Wi-Fi communication, control instructions may be transmitted via the user device 100 which supports both BLUETOOTH® communication and Wi-Fi communication. In other words, the network device 110 may transmit control instructions to the user device 100 via Wi-Fi communication, and then the user device 100 may transmit the control instructions to the peripheral device 120 via BLUETOOTH® control instruction.

According to an exemplary embodiment, the network device 110 may execute an application for controlling the peripheral device 120 according to the peripheral device 120 (operation S1610). Next, the network device 110 transmits control instructions for controlling the peripheral device 120 to the user device 100 (operation S1620). The user device 100 transmits the received control instructions to the peripheral device 120 (operation S1630).

Figure 17:
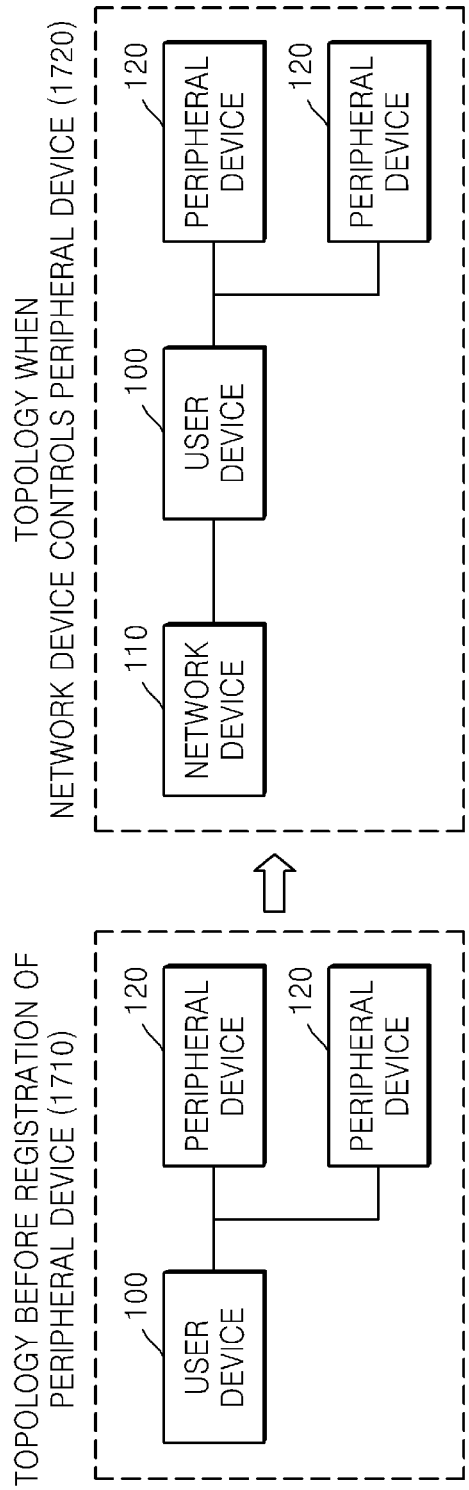
FIG. 17 is a diagram showing a change of a topology when the network device controls the peripheral device, according to another exemplary embodiment.

FIG. 17 is a diagram showing a change of a topology when the network device 110 controls the peripheral device 120, according to another exemplary embodiment.

Before the peripheral device 120 is registered to the network device 110, the peripheral device 120 is connected to the user device 100 (1710).

When the network device 110 controls the peripheral device 120 via the user device 100 as shown in FIG. 16, the network device 110 is connected to the user device 100, and the user device 100 is connected to the peripheral device 120 (1720).

Figure 18:
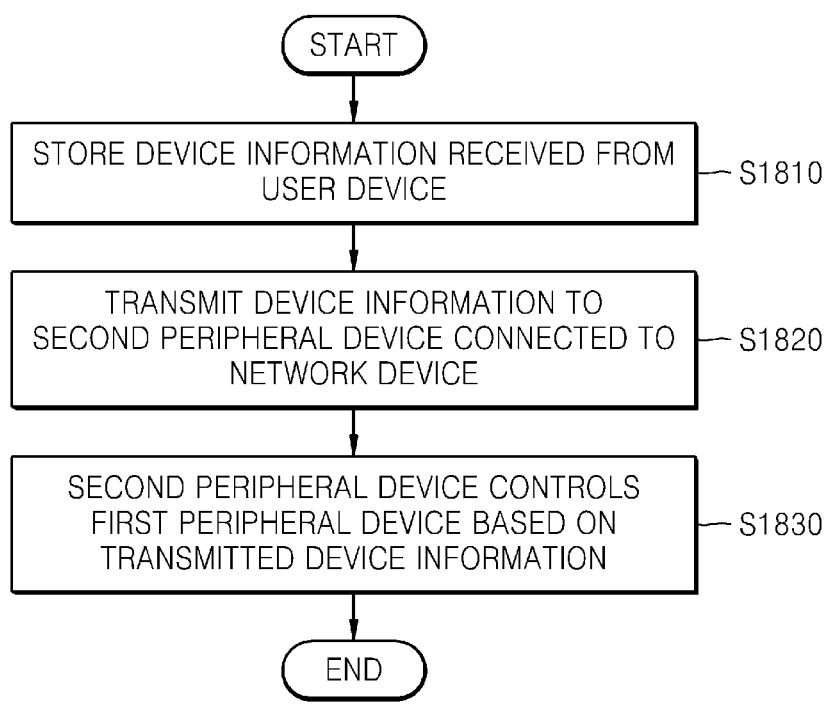
FIG. 18 is a flowchart showing a process in which the other peripheral device connected to the network device controls the peripheral device registered to the network device, according to an exemplary embodiment.

FIG. 18 is a flowchart showing a process in which the other peripheral device 130 connected to the network device 110 controls the peripheral device 120 registered to the network device 110, according to an exemplary embodiment.

First, the network device 110 stores device information regarding the peripheral device 120 received from the user device 100 (operation S1810).

Next, the network device 110 transmits device information to the other peripheral device 130 connected to the network device 110 (operation S1820).

Here, according to an exemplary embodiment, the network device 110 may issue authorization to control the peripheral device 120 to the other peripheral device 130. Authorizations to control the peripheral device 120 issued to the other peripheral devices 130 may vary. For example, if the plurality of other peripheral devices 130 exist, unlimited authorizations regarding the peripheral device 120 may be issued to some of the plurality of other peripheral devices 130, whereas one-time authorizations may be issued to some others of the plurality of the other peripheral devices 130.

According to an exemplary embodiment, authorization to control the peripheral device 120 may be valid for a corresponding number of times, a corresponding period of time, or a corresponding control operation. For example, authorization for a corresponding number of times may allow the other peripheral device 130 to be connected to the peripheral device 120 and to control the peripheral device 120 only once. When the connection between the other peripheral device 130 and the peripheral device 120 is terminated once, the other peripheral device 130 may no longer be authorized to control the peripheral device 120. Furthermore, authorization for a corresponding period of time may allow the other peripheral device 130 to control the peripheral device 120 only for an hour since the authorization to control the peripheral device 120 is issued to the other peripheral device 130. Furthermore, authorization for a corresponding control operation may allow the other peripheral device 130 to perform a control operation related media reproduction with respect to the peripheral device 120 capable of reproducing and editing media. Moreover, the peripheral device 130 may be authorized to perform only certain control operations on the peripheral device 120 according to a set of permission granted to the peripheral device 130. For example, a peripheral device 130 may be authorized to read data from the peripheral device 120 but may not be allowed to write or modify data on the peripheral device 120. Another peripheral device 130 may have the permission to perform both reading and modifying data on the peripheral device 120.

According to an exemplary embodiment, the network device 110 may recognize the other peripheral device 130 and issue authorization based on a result of the recognition. For example, regarding a printer installed to a company gateway, unlimited authorizations may be issued to terminals of employees, whereas one-time authorizations may be issued to terminals of visitors.

Next, the other peripheral device 130 may control the peripheral device 120 based on device information (operation S1830).

Here, according to an exemplary embodiment, if the network device 110 issues authorization to control the peripheral device 120 to the other peripheral device 130, the other peripheral device 130 may control the peripheral device 120 based on the issued authorization.

Figure 19:
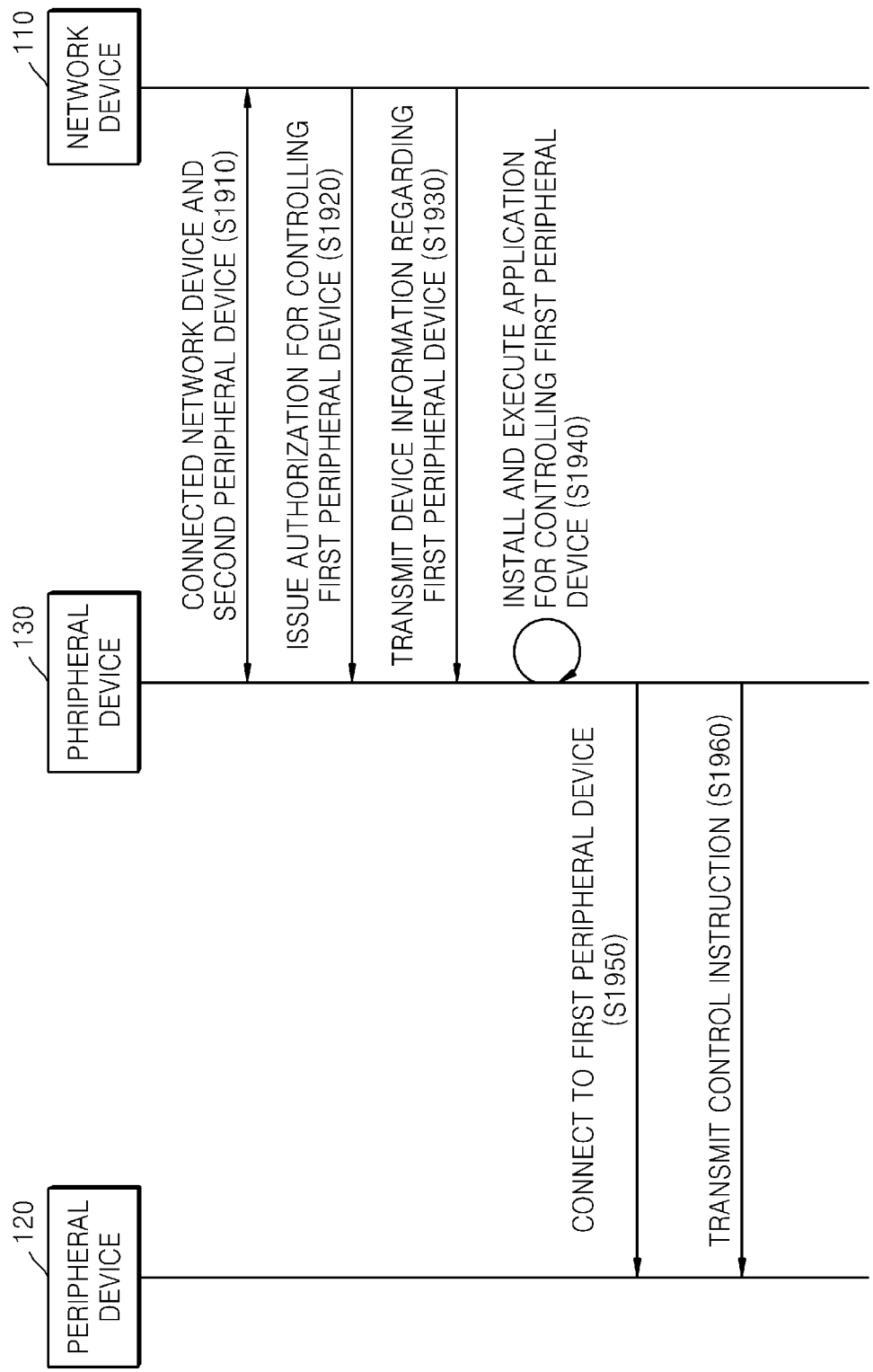
FIG. 19 is a diagram showing a process in which the other peripheral device controls the peripheral device by using device information, according to an exemplary embodiment.

FIG. 19 is a diagram showing a process in which the other peripheral device 130 controls the peripheral device 120 by using device information, according to an exemplary embodiment.

First, the other peripheral device 130 is connected to the network device 110 (operation S1910). Next, the network device 110 issues authorization to control the peripheral device 120 to the other peripheral device 130 (operation S1920). For example, a temporary ID may be issued to the other peripheral device 130. However, operation S1920 may be omitted according to exemplary embodiments, and the network device 110 may transmit device information to the other peripheral device 130 without any particular control authorization.

Next, the network device 110 may transmit device information regarding the peripheral device 120 to the other peripheral device 130 (operation S1930). When the device information is received, the other peripheral device 130 executes an application for controlling the peripheral device 120 (operation S1940). Here, if the application for controlling the peripheral device 120 is not installed on the other peripheral device 130, the other peripheral device 130 may download and install the application for controlling the peripheral device 120.

Next, the other peripheral device 130 may be connected to the peripheral device 120 by using connection information regarding the peripheral device 120 included in the device information (operation S1950). The other peripheral device 130 connected to the peripheral device 120 may transmit control instructions to the peripheral device 120 (operation S1960).

Figure 20:
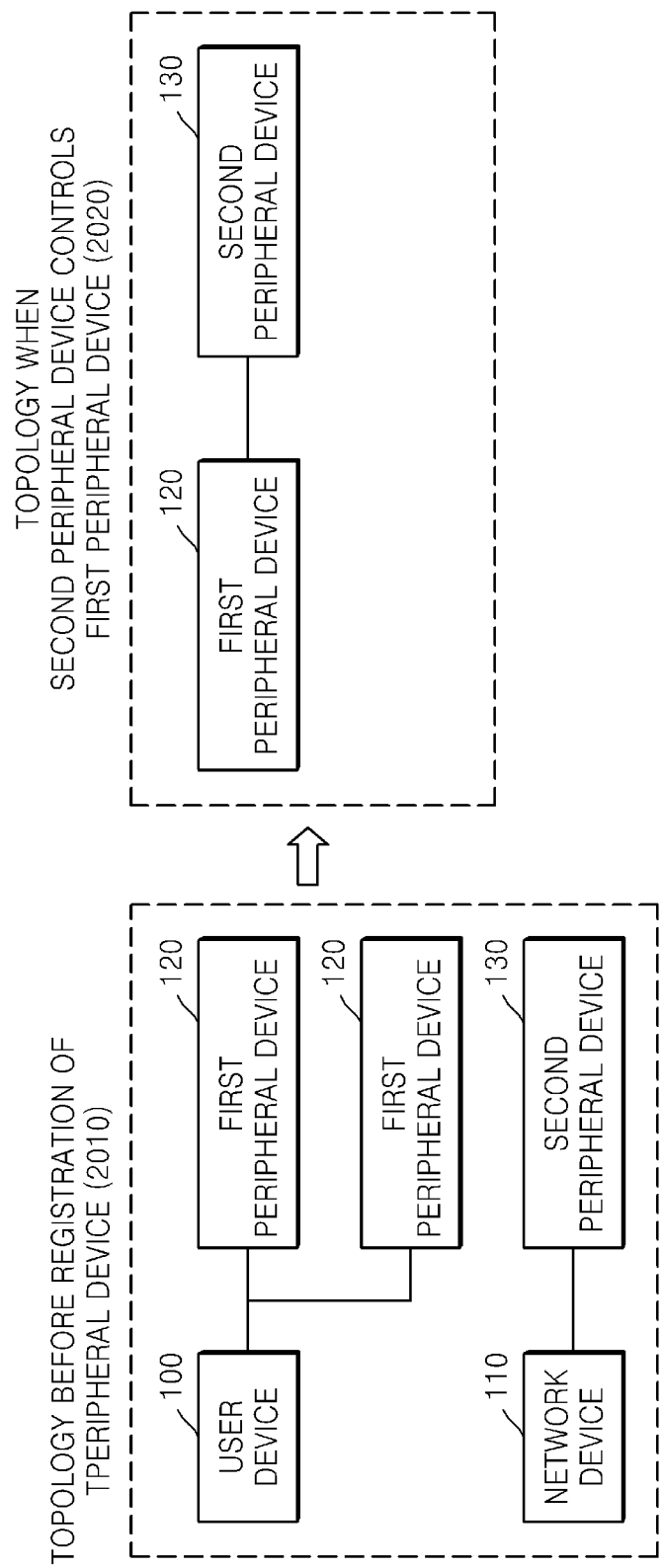
FIG. 20 is a diagram showing a change of a topology when the other peripheral device controls the peripheral device, according to another exemplary embodiment.

FIG. 20 is a diagram showing a change of a topology when the other peripheral device 130 controls the peripheral device 120, according to another exemplary embodiment.

First, before the peripheral device 120 is connected to the network device 110, the peripheral device 120 is connected to the user device 100. Furthermore, the other peripheral device 130 is connected to the network device 110 (2010).

If the peripheral device 120 is registered to the network device 110 and the other peripheral device 130 receives device information and controls the peripheral device 120, the peripheral device 120 may be connected to the other peripheral device 130 (2020).

Figure 21:
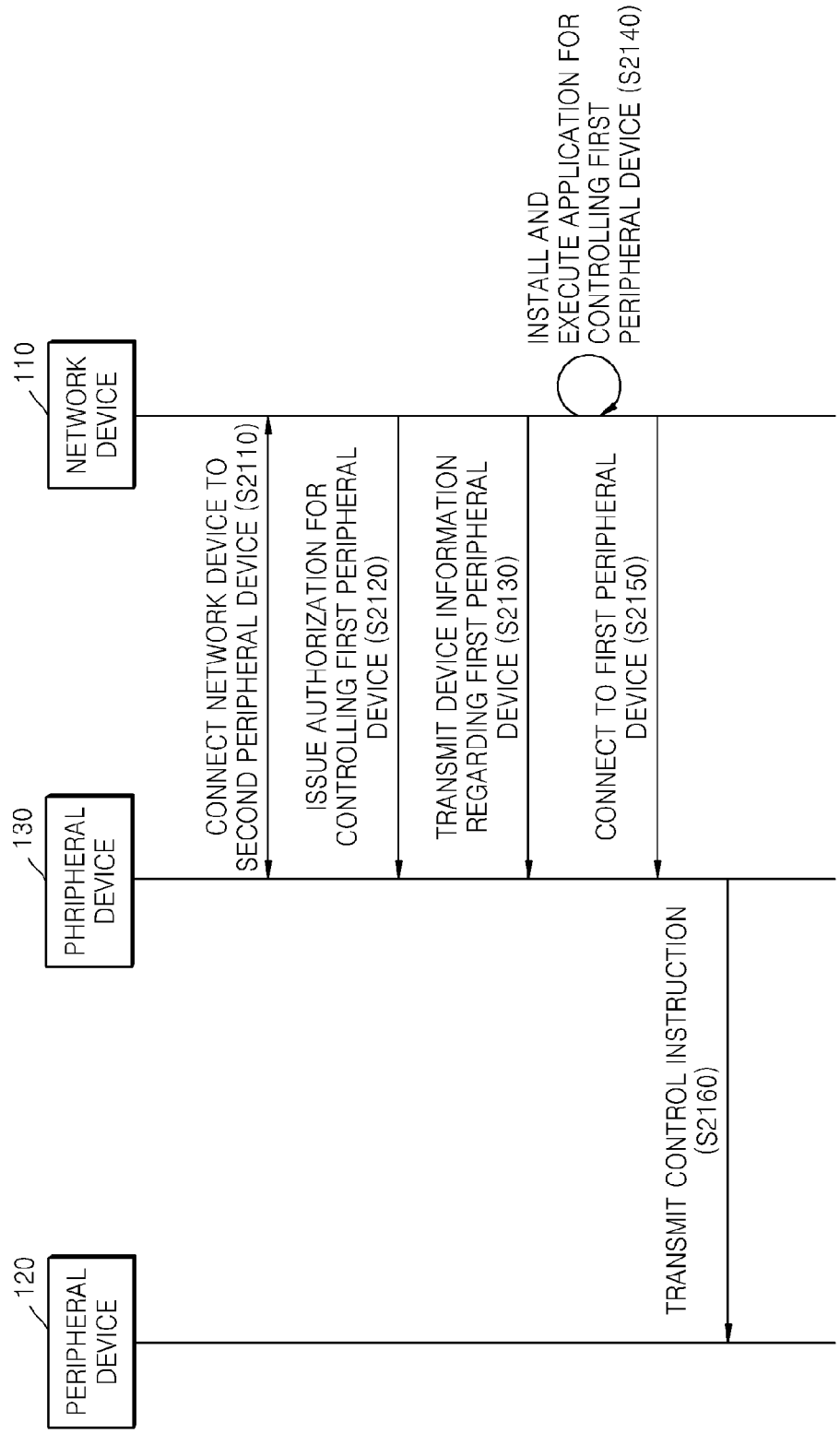
FIG. 21 is a diagram showing a process in which the other peripheral device controls the peripheral device by using device information, according to another exemplary embodiment.

FIG. 21 is a diagram showing a process in which the other peripheral device 130 controls the peripheral device 120 by using device information, according to another exemplary embodiment.

First, the other peripheral device 130 is connected to the network device 110 (operation S2110). Next, the network device 110 issues authorization to control the peripheral device 120 to the other peripheral device 130 (operation S2120). For example, a temporary ID may be issued to the other peripheral device 130. However, operation S2120 may be omitted according to exemplary embodiments, and the network device 110 may transmit device information to the other peripheral device 130 without any particular control authorization according to exemplary embodiments.

Next, the network device 110 may transmit device information regarding the peripheral device 120 to the other peripheral device 130 (operation S2130). Here, according to an exemplary embodiment, the network device 110 may transmit device information without information for connecting to the peripheral device 120, such as a SSID of the peripheral device 120 or a Wi-Fi password, to the other peripheral device 130.

When the device information is received, the other peripheral device 130 executes an application for controlling the peripheral device 120 (operation S2140). Here, if the application for controlling the peripheral device 120 is not installed on the other peripheral device 130, the other peripheral device 130 may download and install the application for controlling the peripheral device 120

Next, the other peripheral device 130 transmits control instructions to the network device 110 (operation S2150). The network device 110, which received the control instructions, may transmit the control instructions to the peripheral device 120 (operation S2160).

Figure 22:
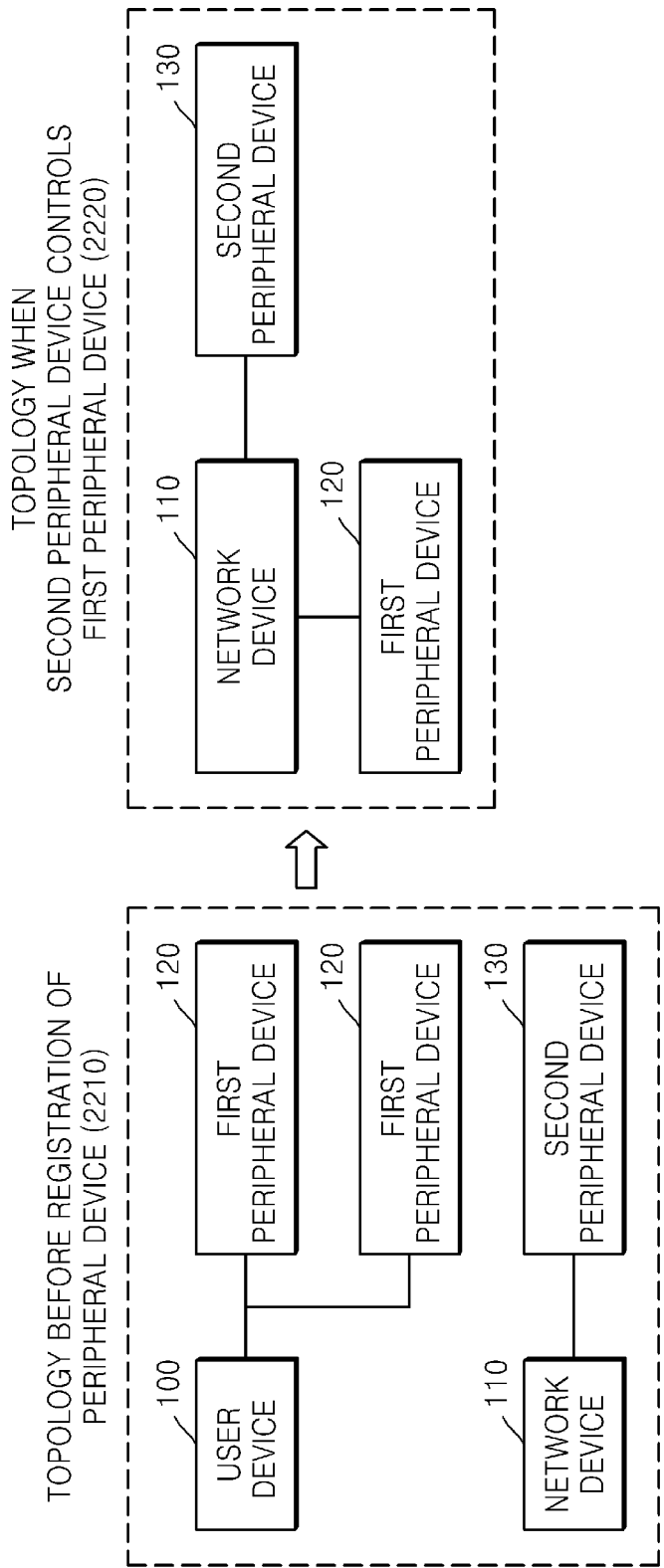
FIG. 22 is a diagram showing a change of a topology when the other peripheral device controls the peripheral device, according to another exemplary embodiment.

FIG. 22 is a diagram showing a change of a topology when the other peripheral device 130 controls the peripheral device 120, according to another exemplary embodiment.

First, before the peripheral device 120 is registered to the network device 110, the peripheral device 120 is connected to the user device 100. Furthermore, the other peripheral device 130 is connected to the network device 110 (2210). The other peripheral device 130 may be connected to the network device 110 (2210).

If the peripheral device 120 is registered to the network device 110 and the other peripheral device 130 receives device information and controls the peripheral device 120, the peripheral device 120 and the other peripheral device 130 may be connected to the network device 110 (2020). The peripheral device 120 and the other peripheral device 130 may transmit and receive control instructions via the network device 110. However, the peripheral device 130 may send commands controlling the peripheral device 120 via one or more communication paths. The one or more communication paths may include and/or involve various combinations of network devices, user devices, and peripheral devices. For example, the peripheral device 130 may send commands controlling the peripheral device 120 via a communication path including only the network device but not the user device; the peripheral device 130 may send commands controlling the peripheral device 120 via a communication path including only an user device but not a network device; or the peripheral device 130 may send commands controlling the peripheral device 120 directly to the peripheral device 120 without intervening network or user devices.

Figure 23:
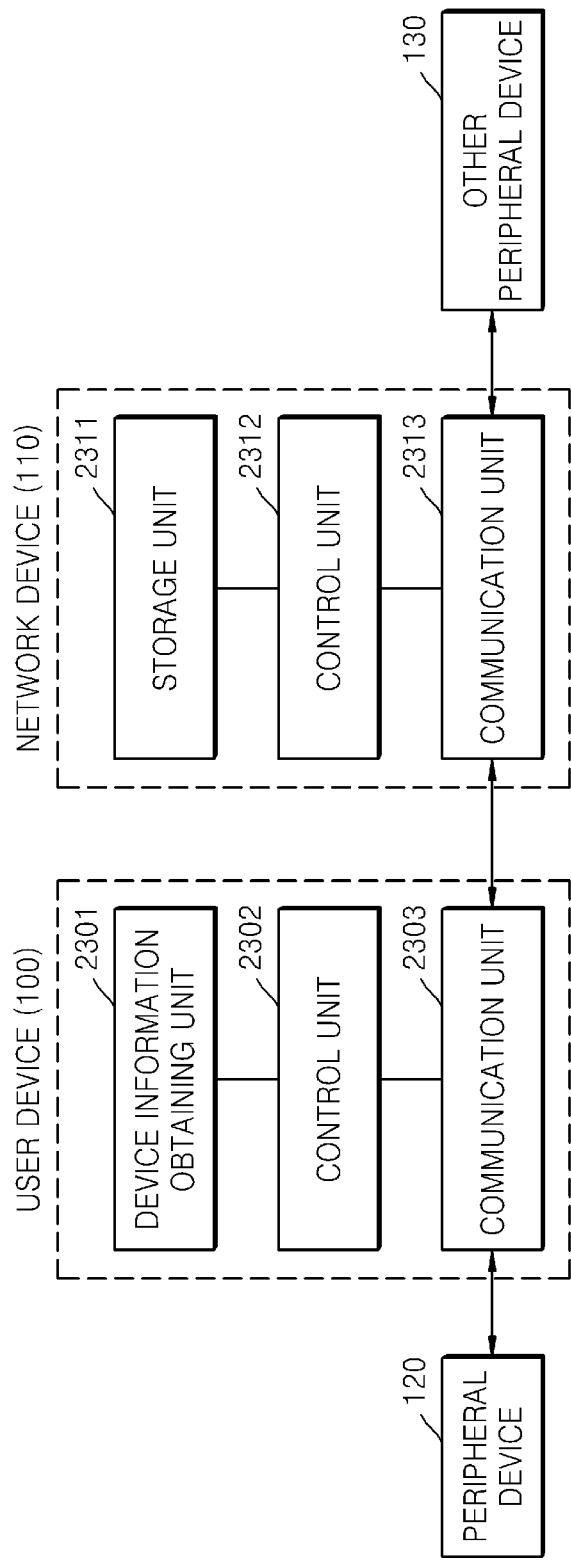
FIG. 23 is a schematic diagram showing structures of the user device and the network device included in a device control system, according to an exemplary embodiment.

FIG. 23 is a schematic diagram showing structures of the user device 100 and the network device 110 included in a device control system, according to an exemplary embodiment.

The device system according to an exemplary embodiment may include the user device 100, which obtains device information regarding the peripheral device 120 and transmits the device information regarding the peripheral device 120 to the network device 110, the network device 110, which stores the device information received from the user device 100 and transmits the device information to the other peripheral device 130, and the other peripheral device 130, which controls the peripheral device 120 by using the device information stored in the network device 110.

Here, the network device 110 according to an exemplary embodiment includes a communication unit 2313 which receives device information regarding the peripheral device 120 connected to the user device 100 and transmits device information to the other peripheral device 130 connected to the network device 110 based on a connection to the user device 100, a control unit 2312 which recognizes the other peripheral device 130 and determines whether to transmit device information based on a result of the recognition, and a storage unit 2311 which stores device information.

According to an exemplary embodiment, the communication unit 2313 arranged at the network device 110 may perform data communication with another device. For example, the communication unit 2313 may be connected to another device via wireless communication, such as Wi-Fi and Near Field wireless communication (NFC), and exchange data with the connected device. Alternatively, the communication unit 2313 may be connected to another device by wire via a data communication cable and exchange data with the connected device.

According to an exemplary embodiment, the control unit 2312 arranged at the network device 110 recognizes the other peripheral device 130 and may determine whether to transmit device information regarding the peripheral device 120. For example, groups of devices that may be connected to the network device 110 may be set in advance, and device information may be transmitted to the other peripheral device 130 belonging to a particular group. Furthermore, the control unit 2312 may control components of the network device 110.

According to an exemplary embodiment, the storage unit 2311 arranged at the network device 110 may store device information. The storage unit 2311 may include a storage medium to and from which data may be written and read.

The user device 100 according to an exemplary embodiment may include a device information obtaining unit 2301 which obtains device information regarding the peripheral device 120, a communication unit 2303 which establishes communication with the network device 110 and transmits device information regarding the peripheral device 120 to the network device 110 based on a connection to the user device 100, and a control unit 2302 which controls components of the user device 100.

According to an exemplary embodiment, the device information obtaining unit 2301 arranged at the user device 100 may obtain device information regarding the peripheral device 120. Here, the device information obtaining unit 2301 may obtain information obtained as the user device 100 is connected to the peripheral device 120 as device information. For example, if the user device 100 and the peripheral device 120 are paired according to the BLUETOOTH® communication standard, the device information obtaining unit 2301 may obtain identification information and a PIN code that are necessary for the pairing as device information.

Alternatively, the device information obtaining unit 2301 may generate a request for transmitting device information regarding the peripheral device 120 and transmit the request to the peripheral device 120, thereby obtaining device information from the peripheral device 120.

Furthermore, according to an exemplary embodiment, the device information obtaining unit 2301 may include a storage medium for storing obtained device information.

According to an exemplary embodiment, the control unit 2302 arranged at the user device 100 may control components of the network device 110. Furthermore, as the peripheral device 120 is connected to the user device 100, the control unit 2302 may execute an application for registering the peripheral device 120 to the network device 110.

The peripheral device 120 according to an exemplary embodiment may transmit device information to the user device 100 and, if a connection request is received from the network device 110 or the other peripheral device 130 based on the device information, the peripheral device 120 may be connected to the network device 110 or the other peripheral device 130 and exchange control instructions therewith.

The other peripheral device 130 according to an exemplary embodiment may receive device information regarding the peripheral device 120 from the network device 110. The other peripheral device 130 which received the device information regarding the peripheral device 120 is connected to the peripheral device 120 and may control the peripheral device 120 by exchanging control instructions with the peripheral device 120.

Figure 24:
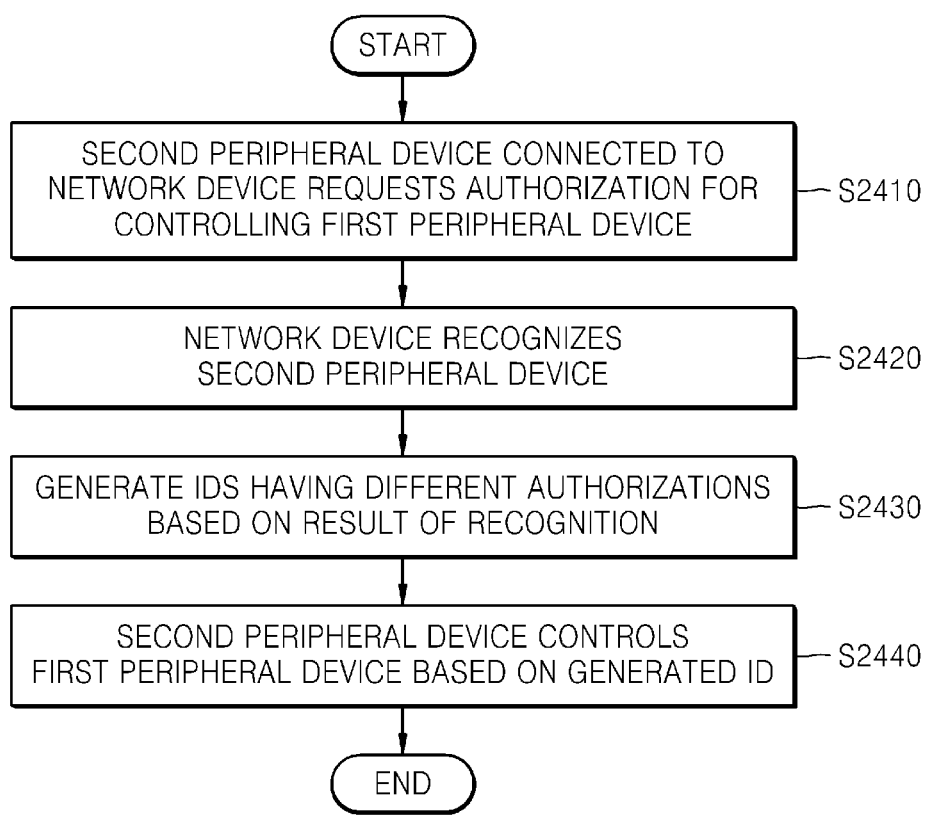
FIG. 24 is a flowchart showing a process in which the network device issues authorization to control the peripheral device to the other peripheral device connected to the network device, according to an exemplary embodiment.

FIG. 24 is a flowchart showing a process in which the network device 110 issues authorization to control the peripheral device 120 to the other peripheral device 130 connected to the network device 110, according to an exemplary embodiment.

First, the network device 110 may receive a request for authorization to control the peripheral device 120 from the other peripheral device 130 connected to the network device 110. Here, the authorization to control the peripheral device 120 may refer to information for controlling a device used to provide service for the other peripheral device 130.

According to an exemplary embodiment, the request for the authorization to control the peripheral device 120 may include information for the network device 110 to select the peripheral device 120. For example, when the other peripheral device 130 transmits control authorization including information regarding a game service provided by the other peripheral device 130 to the network device 110, the network device 110 searches for peripheral devices related to the game service. If a game controller, which is a peripheral device related to the game service, is registered to the network device 110, the network device 110 may select the game controller as the peripheral device 120 regarding which the network device 110 will issue control authorization.

Next, the network device 110 recognizes the other peripheral device 130 (operation S2420) and may generate IDs having different authorizations based on a result of the recognition (operation S2430). Next, the other peripheral device 130 may control the peripheral device 120 based on the generated ID (operation S2440).

Figure 25:
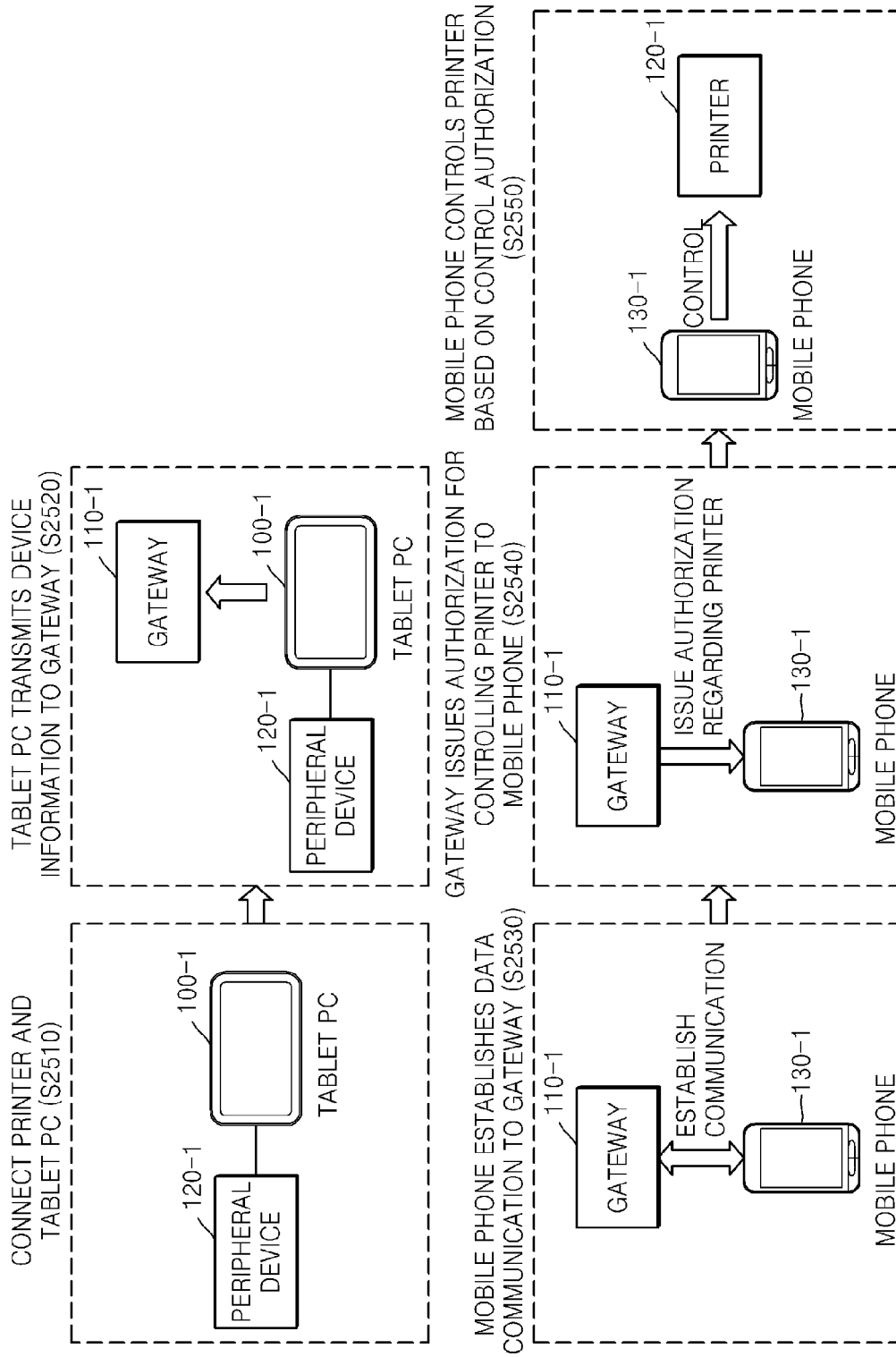
FIG. 25 is a schematic diagram showing an example in which a mobile phone controls a printer registered to a gateway, according to an exemplary embodiment.

FIG. 25 is a schematic diagram showing an example in which a mobile phone controls a printer registered to a gateway, according to an exemplary embodiment.

First, a printer 120-1 establishes data communication with a tablet PC 100-1 (operation S2510). Here, the tablet PC 100-1 may obtain device information of the printer 120-1.

Next, the tablet PC 100-1 registers the printer 120-1 to a gateway 110-1 by transmitting device information of the printer 120-1 to the gateway 110-1 (operation S2520). Here, the gateway 110-1 may be installed at a public location, such as an office or a resident center.

Next, a mobile phone 130-1 establishes data communication with the gateway 110-1 (operation S2530). When the mobile phone 130-1 establishes the data communication with the gateway 110-1, the gateway 110-1 may recognize the mobile phone 130-1. For example, it may be determined whether the mobile phone 130-1 is a terminal belonging to an authorized user and is registered to the gateway 110-1.

Next, the gateway 110-1 issues authorization to control the printer 120-1 to the mobile phone 130-1. The gateway 110-1 may issue authorization to control the printer 120-1 to the mobile phone 130-1 based on a result of recognizing the mobile phone 130-1. For example, if the mobile phone 130-1 is a terminal belonging to an authorizeduser and is registered to the gateway 110-1, unlimited control authorization may be issued to the mobile phone 130-1. On the contrary, if the mobile phone 130-1 is a terminal belonging to an authorizeduser and is not registered to the gateway 110-1, control authorization for printing a document via the printer 120-1 only once may be issued to the mobile phone 130-1.

Next, the mobile phone 130-1 may print a document by controlling the printer 120-1 based on the control authorization.

Figure 26:
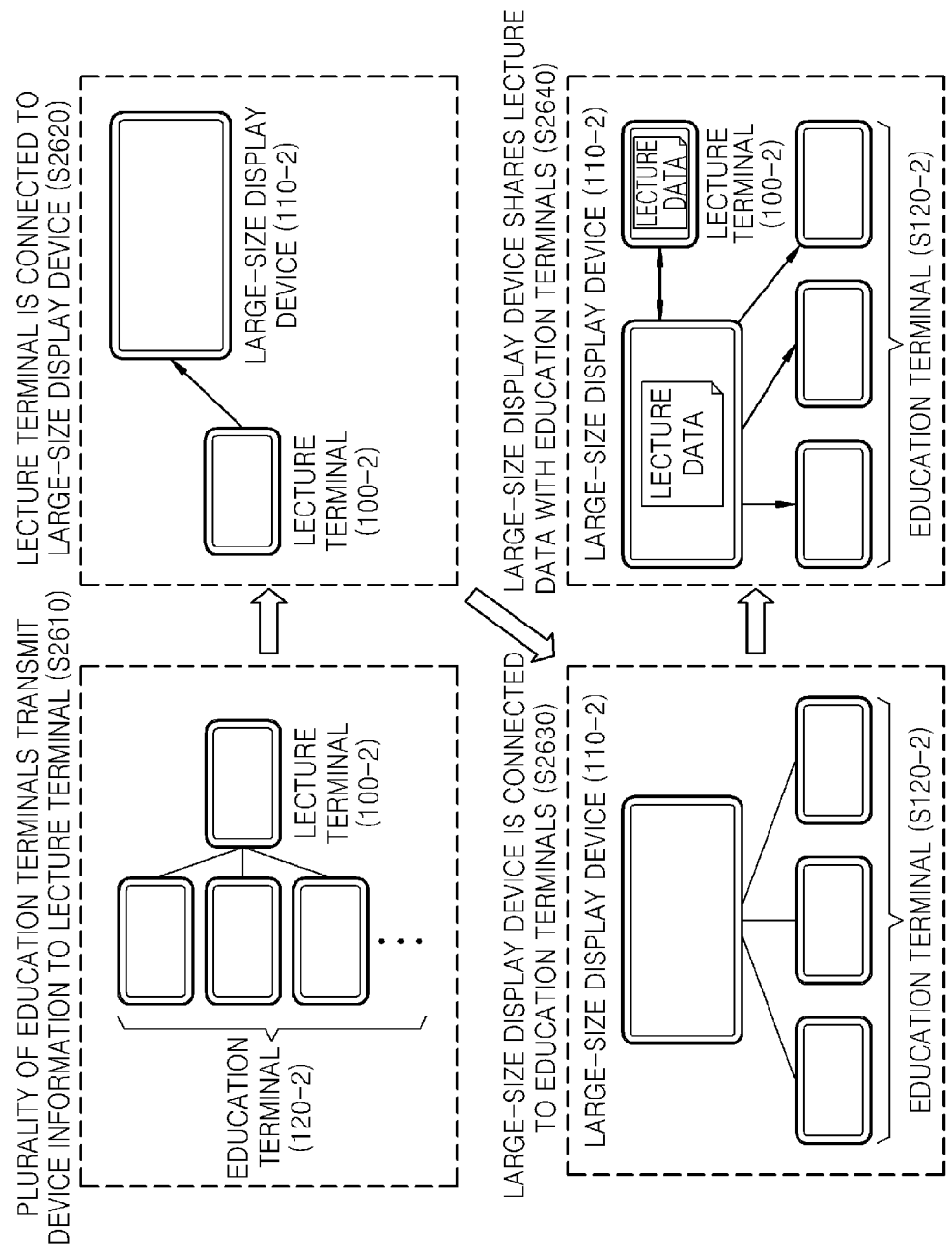
FIG. 26 is a schematic diagram showing an example of registering education terminals connected to a lecture terminal to a large-size display device and controlling the education terminals, according to an exemplary embodiment.

FIG. 26 is a schematic diagram showing an example of registering education terminals connected to a lecture terminal to a large-size display device and controlling the education terminals, according to an exemplary embodiment.

First, a plurality of education terminals 120-2 transmit device information to a lecture terminal 100-2 (operation S2610).

For example, as near field communication (NFC) is established between the education terminal 120-2 and the lecture terminal 100-2, the education terminal 120-2 may transmit device information to the lecture terminal 100-2 via the NFC. According to an exemplary embodiment, the lecture terminal 100-2 may check attendances of students by using received device information.

Here, it is not necessary for the education terminal 120-2 to be directly connected to the lecture terminal 100-2, and the education terminal 120-2 may transmit device information regarding the peripheral device 120 to the lecture terminal 100-2 via another device.

Next, the lecture terminal 100-2 is connected to a large-size display device 110-2 (operation S2620). Here, the lecture terminal 100-2 may transmit device information regarding the education terminal 120-2 to the large-size display device 110-2.

Next, the large-size display device 110-2 is connected to the education terminal 120-2 based on the device information (operation S2630). Here, the large-size display device 110-2 may be connected to the education terminal 120-2 via a network supported by the education terminal 120-2 as indicated in the device information. For example, if the education terminal 120-2 only supports Wi-Fi communication and the large-size display device 110-2 supports Wi-Fi communication and BLUETOOTH® communication, the large-size display device 110-2 may be connected to the education terminal 120-2 via Wi-Fi communication.

Next, the large-size display device 110-2 may share lecture data with the education terminal 120-2 and the lecture terminal 100-2 by controlling the education terminal 120-2 (operation S2640). Here, the sharing of the lecture data refers to the ability of users to watch the same lecture data via the large-size display device 110-2 and the education terminal 120-2.

According to an exemplary embodiment, the education terminal 120-2 may request the large-size display device 110-2 for control authorization regarding lecture data. By approving a request for authorization received from the education terminal the education terminal may control the data displayed on the large-size display device. Therefore, lecture data displayed on the large-size display device 110-2 may be controlled via the education terminal 120-2 by a user of the education terminal, and thus a student may give a presentation.

On the contrary, the large-size display device 110-2 may issue control authorization regarding lecture data to the education terminal 120-2.

Furthermore, according to an exemplary embodiment, the lecture terminal 100-2 may control lecture materials displayed on the large-size display device 110-2. The large-size display device 110-2 may control the educational terminal 120-2 such that the educational terminal 120-2 displays the lecture materials displayed on the large-size display device 110-2.

Figure 27:
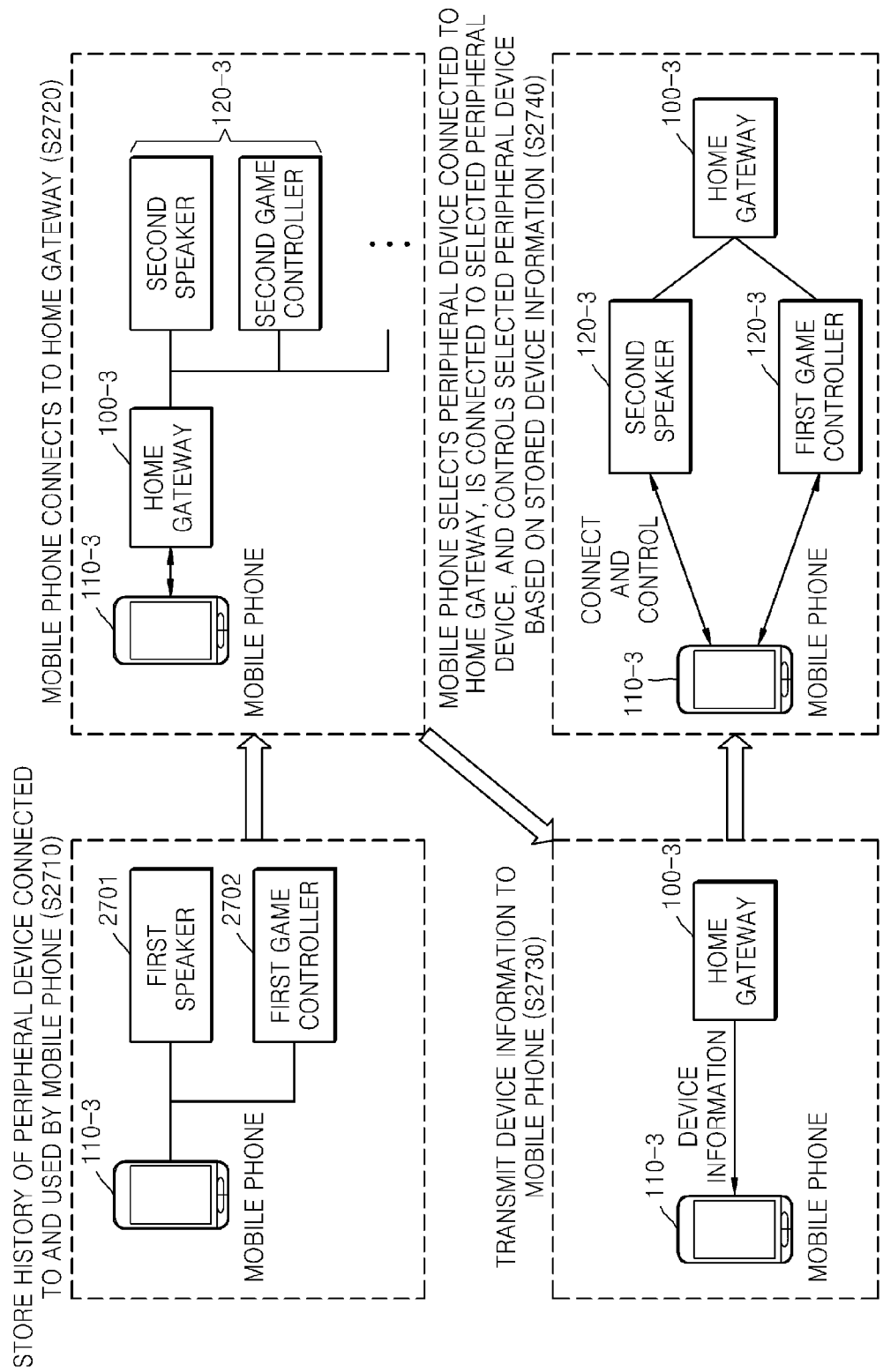
FIG. 27 is a schematic diagram showing an example in which a peripheral device connected to a home gateway is registered to a mobile phone and the mobile phone controls the peripheral device, according to an exemplary embodiment.

FIG. 27 is a schematic diagram showing an example in which a peripheral device connected to a home gateway is registered to a mobile phone 110-3 and the mobile phone 110-3 controls the peripheral device, according to an exemplary embodiment.

First, the mobile phone 110-3 may store a log regarding peripheral devices connected to the mobile phone 110-3 (operation S2710). Here, the log stored in the mobile phone 110-3 may include information regarding services provided by using the peripheral devices and types of the peripheral devices.

For example, if the mobile phone 110-3 has provided a game service by using a first speaker 2701 and a first game controller 2702, device information regarding the first speaker 2701 and the first game controller 2702 used for using the game service may be stored.

Next, the mobile phone 110-3 is connected to the home gateway 100-3 (operation S2720). Here, at least one peripheral device 120-3 may be registered to the home gateway 100-3.

Next, the home gateway 100-3 may transmit device information regarding the registered peripheral device 120-3 to the mobile phone 110-3 (operation S2730).

Next, the mobile phone 110-3 may select device information regarding a second speaker and second game controller 120-3 based on a log stored in the mobile phone 110-3 from the device information received from the home gateway 100-3. Based on the selected device information, the mobile phone 110-3 may be connected to the second speaker and second game controller 120-3 and may exchange control instructions with the second speaker and second game controller 120-3.

Here, the mobile phone 110-3 may transmit control instructions either directly to the second speaker and second game controller 120-3 or via the home gateway 100-3.

Figure 28:
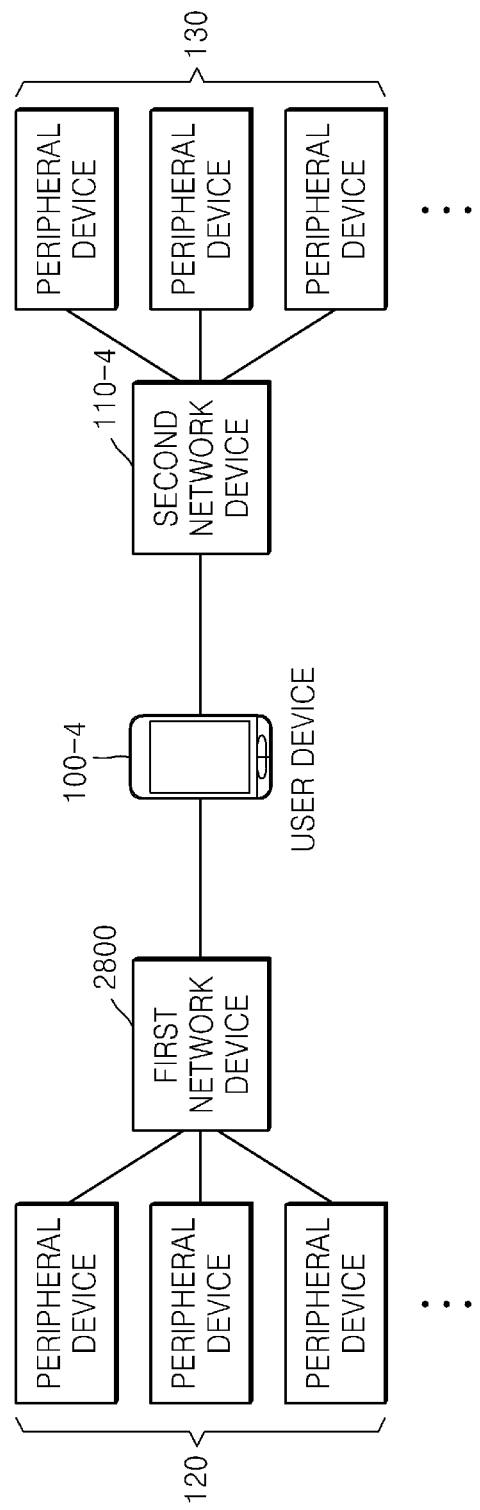
FIG. 28 is a schematic diagram showing a configuration of a device system according to another exemplary embodiment.

FIG. 28 is a schematic diagram showing a configuration of a device system according to another exemplary embodiment.

A user device 100-4 is connected to a first network device 2800, and the first network device 2800 may transmit device information regarding the peripheral device 120 connected to the first network device 2800 to the user device 100-4.

The user device 100-4 which obtained the device information regarding the peripheral device 120 connected to the first network device 2800 may register the obtained device information to a second network device 110-4.

According to an exemplary embodiment, the second network device 110-4 or the other peripheral device 130 connected to the second network device 110-4 may be connected to the peripheral device 120 registered to the first network device 2800 and control the peripheral device 120 by using device information registered to the second network device 110-4.

Furthermore, according to another exemplary embodiment, the second network device 110-4 may control the other peripheral device 130 connected to the second network device 110-4 based on device information registered by the user device 100-4. For example, if device information indicates that an illumination device registered by the user device 100-4 was turned on and a television registered by the user device 100-4 was turned off when the user device 100-4 was connected to the first network device 2800, the second network device 110-4 may turn on an illumination device connected to the second network device 110-4 on and may turn off a television connected to the second network device 110-4, as the user device 100-4 is connected to the second network device 110-4, from among the other peripheral devices 130 connected to the second network device 110-4.

Figure 29:
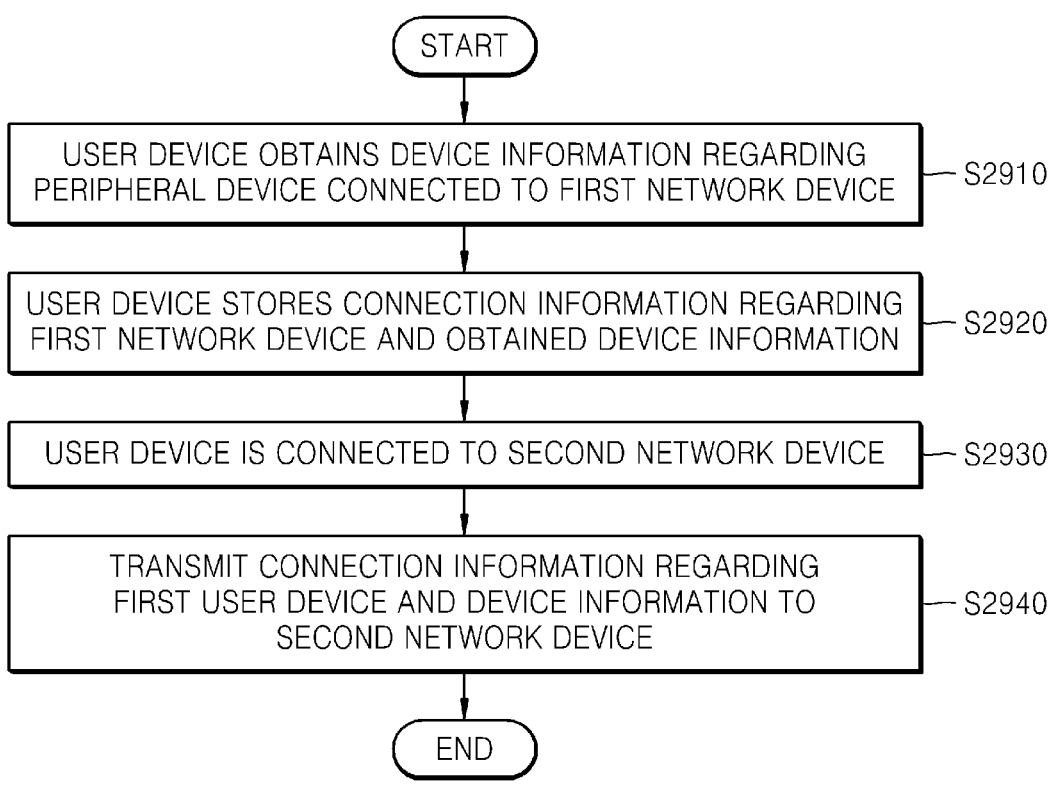
FIG. 29 is a flowchart showing a process for registering the peripheral device, according to another exemplary embodiment.

FIG. 29 is a flowchart showing a process for registering the peripheral device 120, according to another exemplary embodiment.

First, the user device 100-4 obtains device information regarding the peripheral device 120 connected to the first network device 2800 (operation S2910).

Next, the user device 100-4 stores connection information and obtained device information regarding the first network device 2800 (operation S2920).

Next, the user device 100-4 is connected to the second network device 110-4 (operation S2930). When the user device 100-4 recognizes a connection to the second network device 110-4 or receives a request for transmitting device information from the second network device 110-4, the user device 100-4 may transmit device information to the second network device 110-4.

Figure 30:
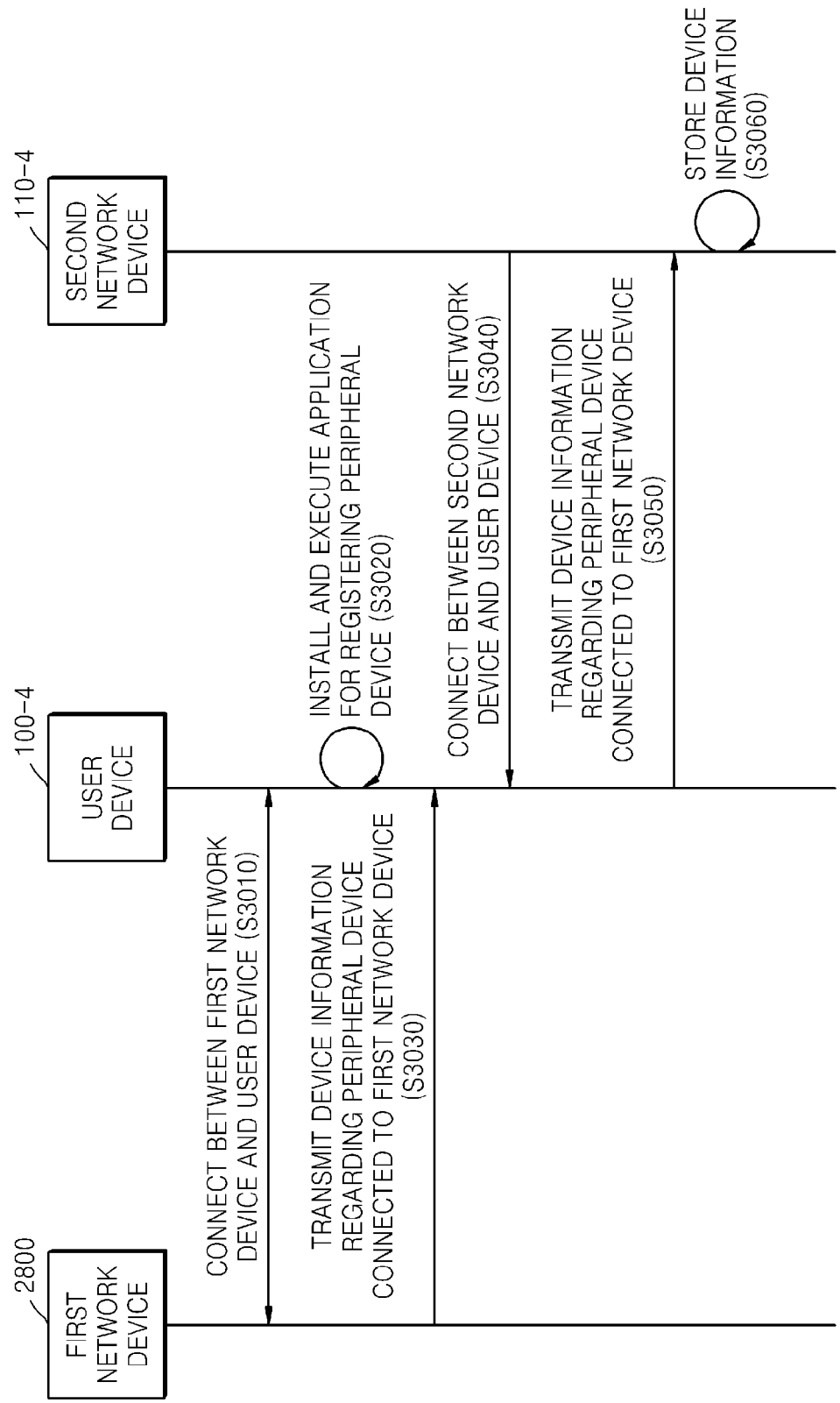
FIG. 30 is a flowchart showing a process for registering the peripheral device according to another exemplary embodiment.

FIG. 30 is a flowchart showing a process for registering the peripheral device 120 according to another exemplary embodiment.

First, the user device 100-4 is connected to the first network device 2800 (operation S3010). Next, as the user device 100-4 is connected to the first network device 2800, the user device 100-4 executes an application for registering the peripheral device 120 (operation S3020).

Next, the first network device 2800 transmits device information regarding the peripheral device 120 connected to the first network device 2800 (operation S3030). The user device 100-4 which executed the application for registering the peripheral device 120 may obtain device information regarding the peripheral device 120.

Next, the user device 100-4 is connected to the second network device 110-4 (operation S3040). The user device 100-4 transmits device information regarding the peripheral device 120 connected to the first network device 2800 to the second network device 110-4 (operation S3050). The second network device 110-4 stores received device information (operation S3060).

Figure 31:
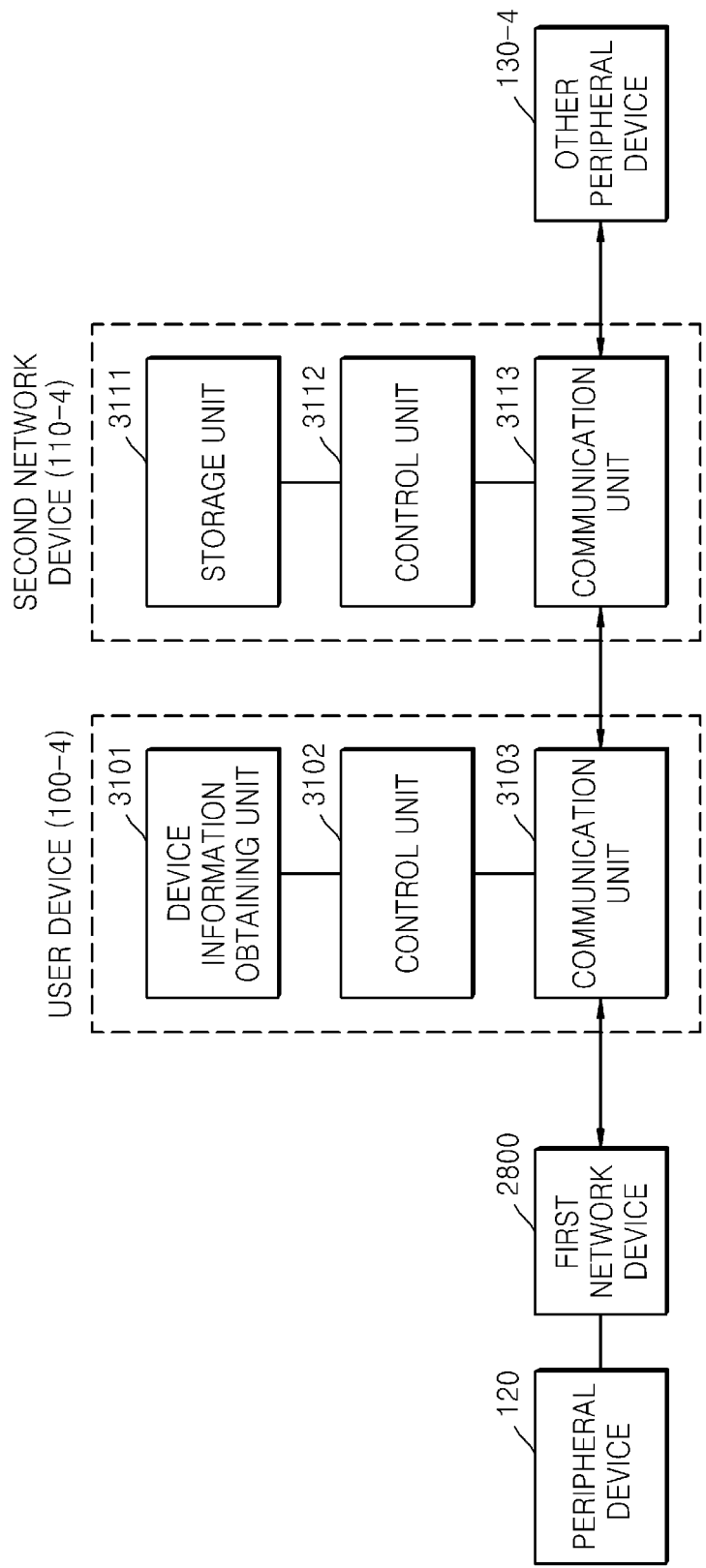
FIG. 31 is a schematic diagram showing structures of the user device and the second network device included in a device system according to another exemplary embodiment.

FIG. 31 is a schematic diagram showing structures of the user device 100-4 and the second network device 110-4 included in a device system according to another exemplary embodiment.

A system for registering device information regarding the peripheral devices to the second network device 110-4 includes the peripheral device 120 which provides device information to the first network device 2800, the first network device 2800 which transmits device information regarding the peripheral device 120 to the user device 100-4, the user device 100-4 which obtains the device information regarding the peripheral device 120 from the first network device 2800 and transmits the device information regarding the peripheral device 120 to the second network device 110-4, the second network device 110-4 which stores the device information received from the user device 100-4, and another peripheral device 130-4 which controls the peripheral device 120 by using the device information stored in the second network device 110-4.

According to an exemplary embodiment, the second network device 110-4 may control the other peripheral device 130-4 connected to the second network device 110-4 based on the device information received from the user device 100-4.

The user device 100-4 according to an exemplary embodiment may include a device information obtaining unit 3101 which obtains device information regarding at least one peripheral device stored in the first network device 2800, a communication unit 3103 which is connected to the second network device 110-4 and transmits received device information to the second network device 110-4, and a control unit 3102 which controls the device information obtaining unit 3101 and the communication unit 3103.

The second network device 110-4 according to an exemplary embodiment may include a communication unit 3113 which receives device information stored in the first network device 2800 from the user device 100-4 and transmits the received device information to the other peripheral device 130 connected to the second network device 110-4, a storage unit 3111 which stores device information, and a control unit 3112 which controls the communication unit 3113 and the storage unit 3111.

Figure 32:
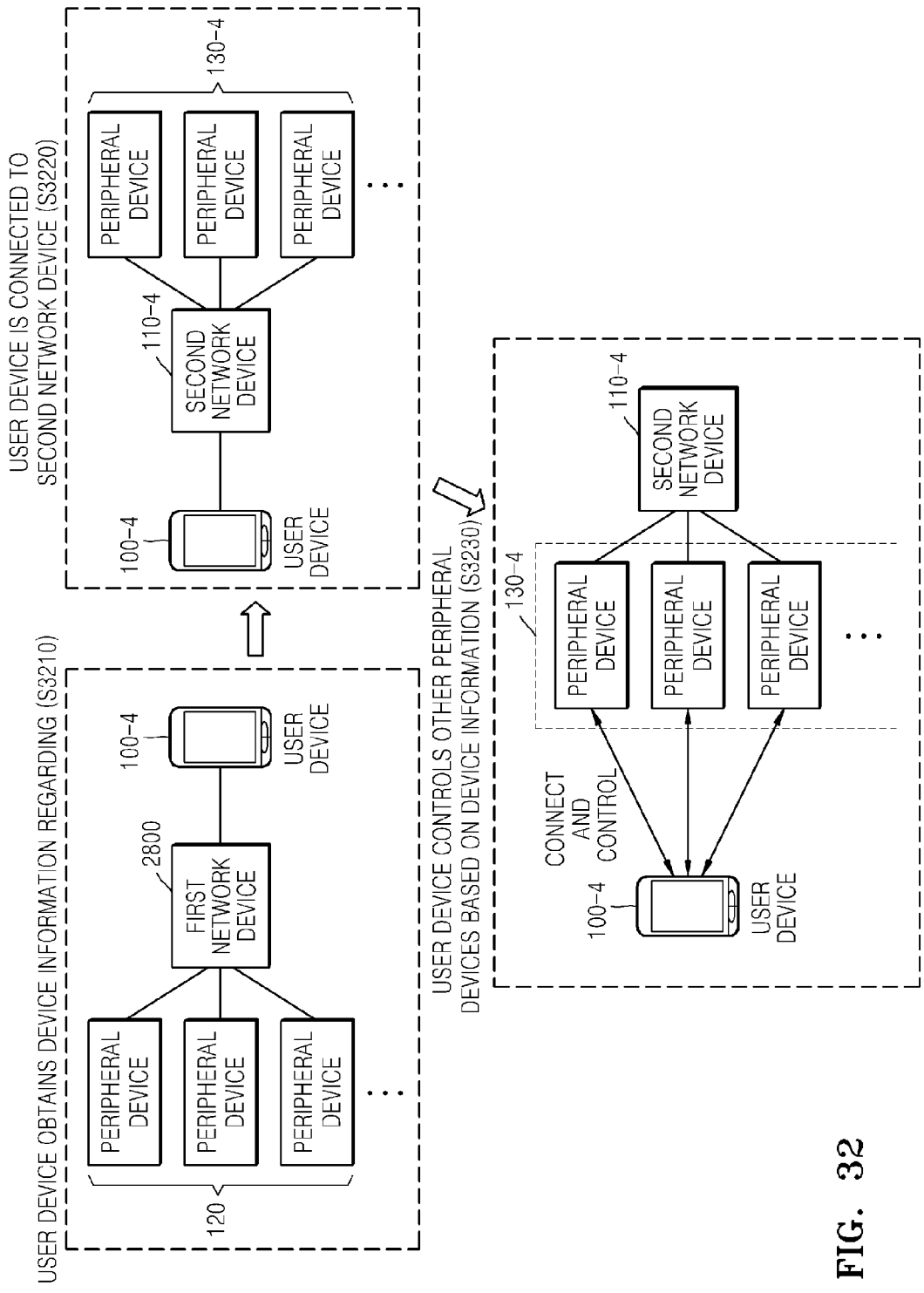
FIG. 32 is a diagram showing an example in which the user device registers and controls the peripheral device, according to an exemplary embodiment.

FIG. 32 is a diagram showing an example in which the user device 100-4 registers and controls the peripheral device 120, according to an exemplary embodiment.

First, the user device 100-4 obtains device information regarding the peripheral device 120 registered to the first network device 2800 (operation S3210).

Next, the user device 100-4 is connected to the second network device 110-4 (operation S3220). Here, the other peripheral device 130 may be registered to the second network device 110-4.

Next, the user device 100-4 may control the other peripheral device 130 based on device information obtained in operation S3210 (operation S3230).

Figure 33:
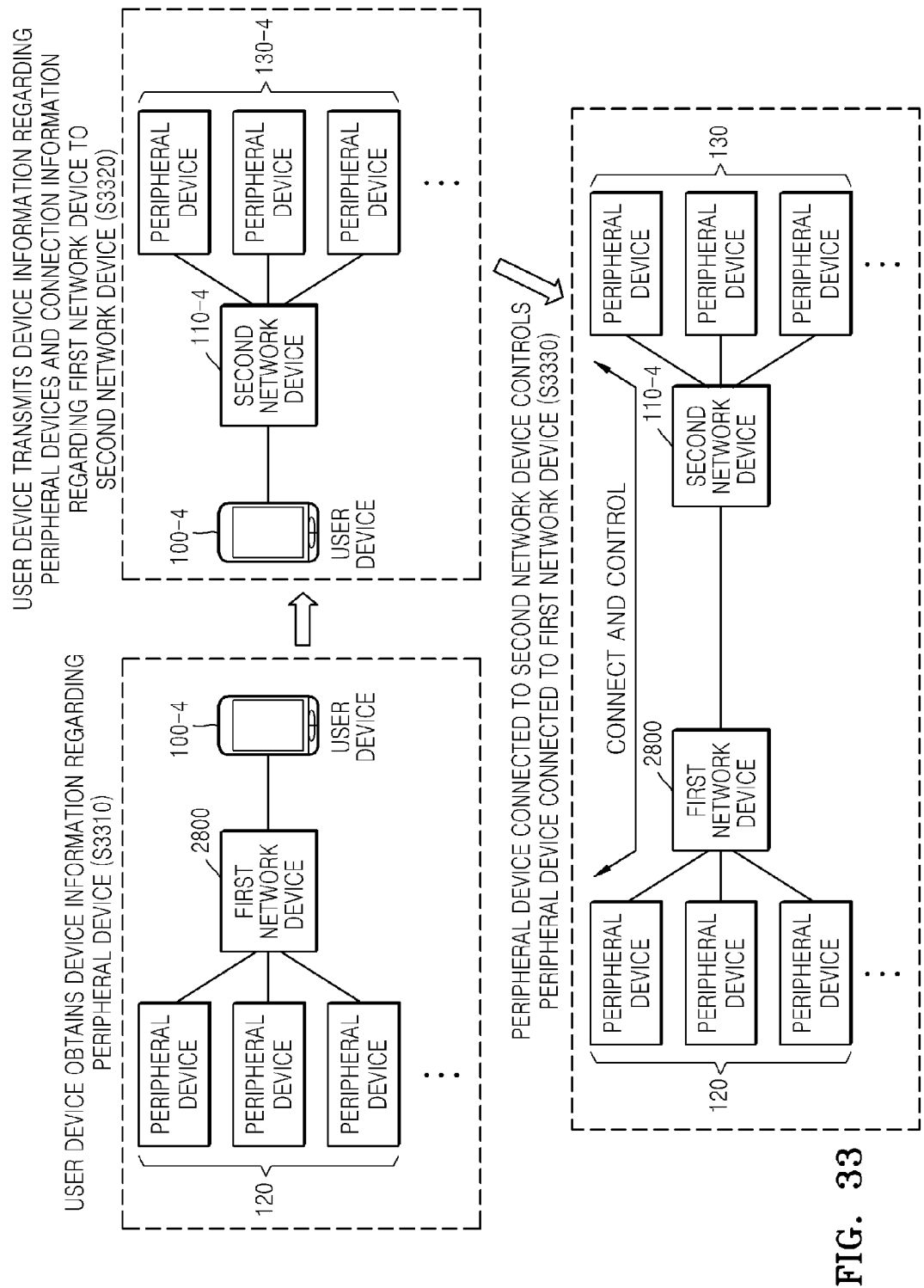
FIG. 33 is a diagram showing an example in which the user device registers and controls the peripheral device, according to another exemplary embodiment.

FIG. 33 is a diagram showing an example in which the user device 100-4 registers and controls the peripheral device 120, according to another exemplary embodiment.

First, the user device 100-4 obtains device information regarding the peripheral device 120 registered to the first network device 2800 (operation S3310).

Next, the user device 100-4 is connected to the second network device 110-4. The user device 100-4 connected to the second network device 110-4 may transmit the device information regarding the peripheral device 120 and connection information regarding the first network device 2800 to the second network device 110-4 (operation S3320).

Here, the connection information regarding the first network device 2800 is information for accessing the first network device 2800. For example, the connection information regarding the first network device 2800 may include an IP address of the first network device 2800 or a connection password.

Next, the second network device 110-4 is connected to the first network device 2800. Next, the second network device 110-4 or the other peripheral device 130 connected to the second network device 110-4 is connected to the peripheral device 120 via the first network device 2800 and may control the peripheral device 120 (operation S3330).

Figure 34:
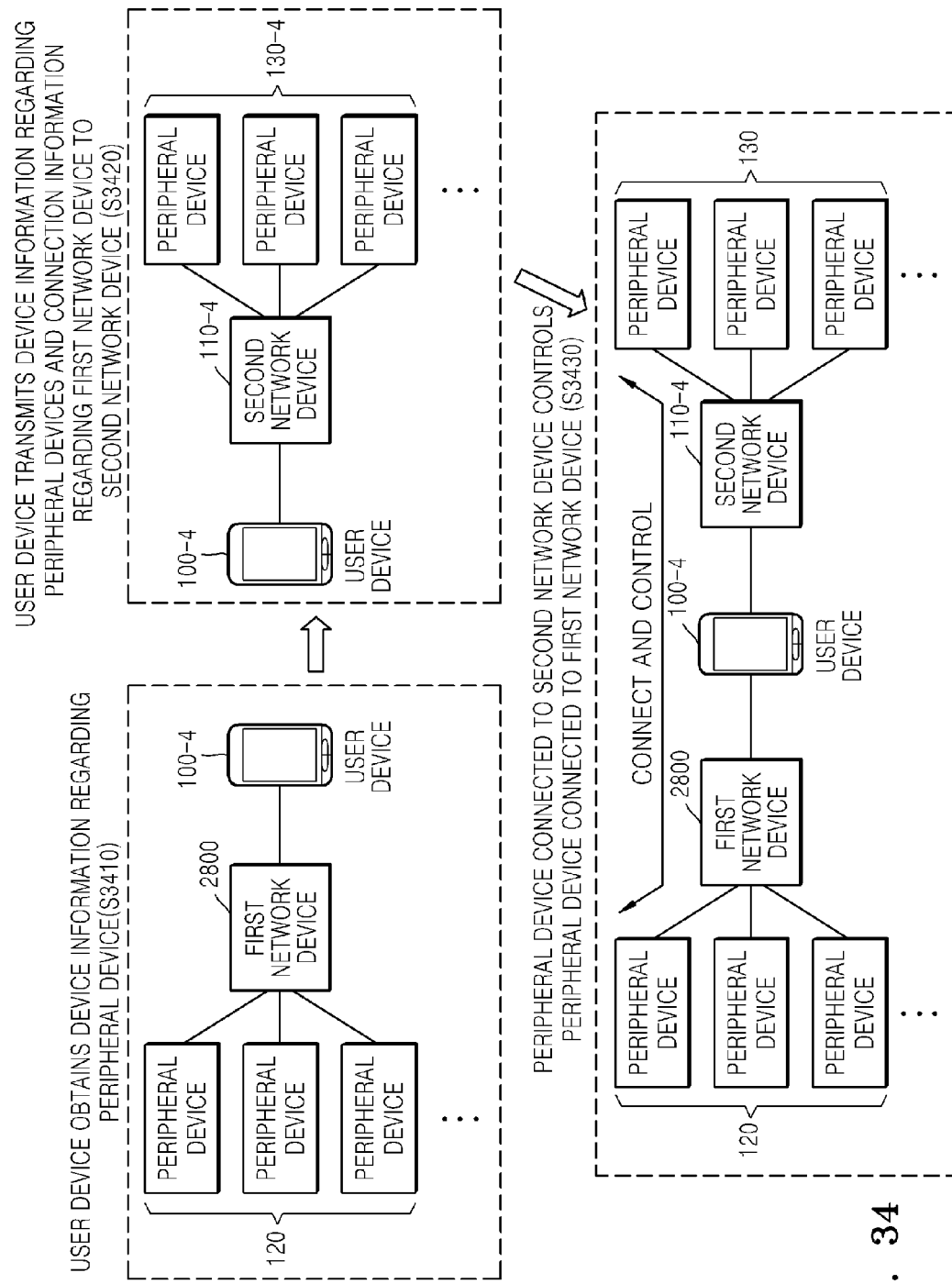
FIG. 34 is a diagram showing an example in which the user device registers and controls the peripheral device, according to another exemplary embodiment.

FIG. 34 is a diagram showing an example in which the user device 100-4 registers and controls the peripheral device, according to another exemplary embodiment.

First, the user device 100-4 obtains device information regarding the peripheral device 120 registered to the first network device 2800 (operation S3410).

Next, the user device 100-4 is connected to the second network device 110-4. The user device 100-4 connected to the second network device 110-4 may transmit the device information regarding the peripheral device 120 to the second network device 110-4 (operation S3420).

Next, the second network device 110-4 is connected to the first network device 2800 via the user device 100-4. Next, the second network device 110-4 or the other peripheral device 130 connected to the second network device 110-4 are connected to the peripheral device 120 via the user device 100-4 and the first network device 2800 and may control the peripheral device 120 (operation S3430).

As described above, the user device 100-4 may function as a router for providing a path via which the second network device 110-4 or the other peripheral device 130 connected to the second network device 110-4 is connected to the peripheral device 120.

However, the peripheral device 130 may send commands controlling the peripheral device 120 via one or more communication paths. The one or more communication paths may include and/or involve various combinations of network devices, user devices, and peripheral devices. For example, the peripheral device 130 may send commands controlling the peripheral device 120 via a communication path including only a network device but not an user device; the peripheral device 130 may send commands controlling the peripheral device 120 via a communication path including only an user device but not a network device; or the peripheral device 130 may send commands controlling the peripheral device 120 directly to the peripheral device 120 without intervening network or user devices.

The process shown in FIG. 34 may be useful when it is not possible or it is not desired to transmit connection information regarding the first network device 2800 to the second network device 110-4.

FIG. 35 is a diagram showing device information according to an exemplary embodiment.

According to an exemplary embodiment, the device information may include information for recognizing the peripheral device 120. For example, as shown in FIG. 35, the device information may include information regarding a name of the peripheral device 120 or a group to which the peripheral device 120 belongs. Furthermore, when the network device 110 stores the device information, the network device 110 may issue an ID to the peripheral device 120 and may store the device information together with the ID.

Furthermore, according to an exemplary embodiment, device information may include information for accessing the peripheral device 120. For example, as shown in FIG. 35, the device information may include an IP address, a MAC address, a connection port, or a SSID of the peripheral device 120.

Furthermore, according to an exemplary embodiment, the device information may include information regarding a status of the peripheral device 120. For example, as shown in FIG. 35, the device information may include information regarding a current power status of the peripheral device 120, a period of time for which the user device 100 has been connected to the peripheral device 120 and used the peripheral device 120, and a number of times that the user device 100 has been connected to the peripheral device 120.

An exemplary embodiment may be also embodied as a computer readable recording medium including commands that may be executed by a computer, e.g., a program module to be executed by a computer. Computer readable recording media may be an arbitrary medium that may be accessed by a computer and includes volatile and non-volatile media and detachable and fixed type media. Furthermore, the computer readable recording media may include computer readable recording media and communication media. The computer readable recording media include volatile and non-volatile media and detachable and fixed type media that are embodied using arbitrary methods or techniques for storing data, such as computer-recognizable commands, data structures, program modules, and various other data. The communication media typically include computer-recognizable commands, data structures, program modules, various other data regarding modulated data signals like carrier waves, and various other transmission mechanisms and include arbitrary data transmission media.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A device control method for controlling a device, the device control method comprising:
   providing a first connection structure in which a user device is connected to a first peripheral device, the first peripheral device being controlled by the user device;
   obtaining, by the user device, a device information regarding the first peripheral device;
   changing the first connection structure to a second connection structure by:
      transmitting, by the user device, the device information to a network device,
      storing, by the network device, the device information, and
      causing a second peripheral device, which is connected to the network device, to become paired with the first peripheral device in response to receiving, by the second peripheral device, the device information of the first peripheral device; and
   controlling, by the second peripheral device, the first peripheral device by using the device information,
   wherein, as a result of the changing to the second connection structure, the first peripheral device is directly controlled by the second peripheral device in place of the user device,
   wherein the device information comprises at least one among an IP address, a MAC address, a connection port, and a service set identification (SSID) of the first peripheral device, and
   wherein the user device and the first peripheral device are not connected to the second peripheral device in the first connection structure.

2. The device control method of claim 1, wherein the device information further comprises a uniform resource locator (URL) information for downloading an application for controlling the first peripheral device, and
   the device control method further comprising downloading and installing the application based on the URL information, the downloading and the installing being performed by the second peripheral device.

3. The device control method of claim 1, further comprising:
   connecting to the network device and receiving authorization for controlling the first peripheral device, the connecting and the receiving being performed by the second peripheral device; and
   controlling by the second peripheral device, the first peripheral device.

4. The device control method of claim 3, wherein the authorization for controlling the first peripheral device is valid for a corresponding number of times, a corresponding period of time, or a corresponding control operation.

5. The device control method of claim 3, wherein the connecting to the network device and the receiving the authorization for controlling the first peripheral device comprises:
   recognizing, by the network device, the second peripheral device; and
   receiving, by the second peripheral device, the authorization based on a result of the recognizing.

6. The device control method of claim 1, wherein the transmitting the device information comprises:
   if the network device is connected to the user device, requesting, by the network device, the user device to transmit the device information; and
   transmitting, by the user device, the device information to the network device in response to the requesting.

7. The device control method of claim 1, further comprising:
  transmitting by the user device, connection information regarding the network device to the first peripheral device; and
  transmitting by the first peripheral device, the device information to the network device based on the connection information regarding the network device.

8. The device control method of claim 1, further comprising transmitting information regarding a recommended service according to the device information, by the network device to the user device.

9. The device control method of claim 1, further comprising:
  receiving by the user device, the device information from the network device; and
  if the user device is connected to a second network device, transmitting by the user device, the device information to the second network device,
  wherein the second network device controls a third peripheral device connected to the second network device by using the device information.

10. A device control method by which a network device registers a first peripheral device, the device control method comprising:
  receiving a device information regarding the first peripheral device from a user device, the first peripheral device being connected to the user device in a first connection structure in which the first peripheral device is controlled by the user device;
  storing the device information in the network device; and
  transmitting the device information to a second peripheral device connected to the network device,
  wherein the second peripheral device is configured to change the first connection structure to a second connection structure by becoming paired with the first peripheral device in response to receiving, by the second peripheral device, the device information of the first peripheral device,
  wherein, as a result of the changing to the second connection structure, the first peripheral device is directly controlled by the second peripheral device in place of the user device,
  wherein the device information comprises at least one among an IP address, a MAC address, a connection port, and a service set identification (SSID) of the first peripheral device, and
  wherein the user device and the first peripheral device are not connected to the second peripheral device in the first connection structure.

11. The device control method of claim 10, wherein the device information further comprises a uniform resource locator (URL) information for downloading an application for controlling the first peripheral device.

12. The device control method of claim 10, further comprising:
  recognizing or determining an identity of the second peripheral device; and
  allocating an identification (ID) to the second peripheral device based on a result of the recognizing or a result of the determining the identity,
  wherein the second peripheral device controls the first peripheral device according to authorization information corresponding to the ID.

13. The device control method of claim 12, wherein the device information transmitted to the second peripheral device additionally comprises the ID.

14. The device control method of claim 13, wherein the authorization for controlling the first peripheral device is valid for a corresponding number of times, a corresponding period of time or a corresponding control operation.

15. The device control method of claim 10, wherein the receiving the device information from the user device comprises:
  if the network device is connected to the user device, requesting by the network device, the user device for the device information; and
  receiving by the network device, the device information from the user device in response to the requesting.

16. The device control method of claim 10, wherein the receiving of the device information comprises:
  connecting the network device to the first peripheral device in response to a connection request received from the first peripheral device; and
  receiving the device information from the first peripheral device.

17. The device control method of claim 10, further comprising transmitting, to the user device, information regarding recommended services according to the device information.

18. A device control method by which a network device registers a first peripheral device, the device control method comprising:
  receiving a device information regarding the first peripheral device from a user device, the first peripheral device being connected to the user device in a first connection structure in which the first peripheral device is controlled by the user device; and
  changing the first connection structure to a second connection structure by transmitting the device information to a second peripheral device connected to the network device, and causing the second peripheral device to become paired with the first peripheral device in response to receiving, by the second peripheral device, the device information of the first peripheral device,
  wherein, as a result of the changing to the second connection structure, the first peripheral device is directly controlled by the second peripheral device in place of the user device,
  wherein the device information comprises at least one among an IP address, a MAC address, a connection port, and a service set identification (SSID) of the first peripheral device, and
  the user device and the first peripheral device are not connected to the second peripheral device in the first connection structure.

19. The device control method of claim 18, wherein the device information further comprises uniform resource locator (URL) information for downloading an application for controlling the first peripheral device,
  the device control method further comprising downloading and installing the application based on the URL information.

20. The device control method of claim 18, wherein the receiving the device information comprises:
  if the network device is connected to the user device, requesting by the network device, the user device for the device information; and
  receiving by the network device, the device information from the user device in response to the requesting.

21. The device control method of claim 18, wherein the receiving of the device information comprises:

receiving a connection request from the first peripheral device;

connecting to the first peripheral device in response to the connection request; and receiving the device information from the first peripheral device.

22. The device control method of claim 18, further comprising transmitting, to the user device, information regarding recommended services according to the device information.

23. A device control method for registering a first peripheral device, to a second network device, the device control method comprising:

receiving a device information regarding the first peripheral device from a user device, the first peripheral device being connected to a first network device in a first connection structure in which the first peripheral device is controlled by the first network device;

storing the device information in the second network device; and changing the first connection structure to a second connection structure by transmitting the stored device information to a second peripheral device connected to the second network device, and causing the second peripheral device to become paired with the first peripheral device, wherein, as a result of the changing to the second connection structure, the first peripheral device is directly controlled by the second peripheral device, wherein the device information comprises at least one among an IP address, a MAC address, a connection port, and a service set identification (SSID) of the first peripheral device, and the first network device and the first peripheral device are not connected to the second network device and the second peripheral device in the first connection structure.

24. A device control system comprising:

a user device, which is configured to obtain a device information regarding a first peripheral device connected to the user device in a first connection structure, the first peripheral device being controlled by the user device in the first connection structure, and to transmit the device information to a network device, wherein the network device is configured to store the device information received from the user device, and to transmit the device information to a second peripheral device connected to the network device, wherein the second peripheral device is configured to, in response to receiving the device information of the first peripheral device, change the first connection structure to a second connection structure by becoming paired with the first peripheral device, and is further configured to control the first peripheral device by using the device information, wherein, as a result of changing to the second connection structure, the first peripheral device is directly controlled by the second peripheral device in place of the user device, wherein the device information comprises at least one among an IP address, a MAC address, a connection port, and a service set identification (SSID) of the first peripheral device, and wherein the user device and the first peripheral device are not connected to the second peripheral device in the first connection structure.

25. A network device for registering a first peripheral device, the network device comprising:

a processor and a memory containing instructions which, when executed by the processor, cause the processor to control a communicator to receive, from a user device, a device information regarding the first peripheral device connected to the user device in a first connection structure, the first peripheral device being controlled by the user device in the first connection structure, and to transmit the device information to a second peripheral device connected to the network device, to recognize the second peripheral device and to determine whether to transmit the device information, and to control a storage unit to store the device information, wherein the second peripheral device is configured to change the first connection structure to a second connection structure by becoming paired with the first peripheral device in response to receiving the device information of the first peripheral device, wherein, as a result of changing to the second connection structure, the first peripheral device is directly controlled by the second peripheral device in place of the user device, wherein the user device and the first peripheral device are not connected to the second peripheral device in the first connection structure, and wherein the device information comprises at least one among an IP address, a MAC address, a connection port, and a service set identification (SSID) of the first peripheral device.

26. A user device for registering, to a network device, a first peripheral device, the user device comprising:

a processor and a memory containing instructions which, when executed by the processor, cause the processor to obtain a device information regarding the first peripheral device connected to the user device in a first connection structure in which the first peripheral device is controlled by the user device, the device information comprising at least one among an IP address, a MAC address, a connection port, and a service set identification (SSID) of the first peripheral device, and a uniform resource locator (URL) information for downloading an application for controlling the first peripheral device, and to change the first connection structure to a second connection structure by:

controlling a communicator to establish a connection with the network device and transmit the device information to the network device via the connection between the user device and the network device, and causing a second peripheral device, which is connected to the network device, to become paired with the first peripheral device in response to receiving the device information of the first peripheral device, wherein the network device is configured to control the first peripheral device by downloading and installing the application based on the URL information, wherein, as a result of changing to the second connection structure, the first peripheral device is directly controlled by the second peripheral device in place of the user device, and wherein the user device and the first peripheral device are not connected to the second peripheral device in the first connection structure.

27. A second network device for registering a first peripheral device, the second network device comprising:

a processor and a memory containing instructions which, when executed by the processor, cause the processor to control a communicator to receive, from a user device, a device information stored in a first network device connected to the first peripheral device in a first connection structure in which the first peripheral device is controlled by the first network device, and transmit the device information to a second peripheral device connected to the second network device, and to control a storage unit to store the device information in the second network device, wherein the second peripheral device is configured to change the first connection structure to a second connection structure by becoming paired with the first peripheral device in response to receiving the device information of the first peripheral device, wherein, as a result of changing to the second connection structure, the first peripheral device is directly controlled by the second peripheral device, wherein the first network device and the first peripheral device are not connected to the second network device and the second peripheral device in the first connection structure, and wherein the device information comprises at least one among an IP address, a MAC address, a connection port, and a service set identification (SSID) of the first peripheral device.

28. A non-transitory computer readable recording medium having recorded thereon a computer program which, when executed by a processor, causes the processor to execute a method comprising:

receiving a device information regarding a first peripheral device from a user device connected to the first peripheral device in a first connection structure, the first peripheral device being controlled by the user device in the first connection structure;

storing the device information in a network device; and changing the first connection structure to a second connection structure by transmitting the device information to a second peripheral device connected to the network device, and causing the second peripheral device to become paired with the first peripheral device in response to receiving, by the second peripheral device the device information of the first peripheral device, wherein, as a result of the changing to the second connection structure, the first peripheral device is directly controlled by the second peripheral device in place of the user device, wherein the device information comprises at least one among an IP address, a MAC address, a connection port, and a service set identification (SSID) of the first peripheral device, and wherein the user device and the first peripheral device are not connected to the second peripheral device in the first connection structure.

29. A non-transitory computer readable recording medium having recorded thereon a computer program which, when executed by a processor, causes the processor to execute a method comprising:

receiving, by a second network device, a device information regarding a first peripheral device, from a user device connected to a first network device in a first connection structure in which the first peripheral device is controlled by the first network device;

storing the device information in the second network device; and changing the first connection structure to a second connection structure by:
transmitting the stored device information to a second peripheral device connected to the second network device, and
causing the second peripheral device to become paired with the first peripheral device in response to receiving, by the second peripheral device, the device information of the first peripheral device, wherein, as a result of the changing to the second connection structure, the first peripheral device is directly controlled by the second peripheral device, wherein the device information comprises at least one among an IP address, a MAC address, a connection port, and a service set identification (SSID) of the first peripheral device, and wherein the user device and the first peripheral device are not connected to the second network device and the second peripheral device in the first connection structure.

30. The device control method of claim 23, wherein the second peripheral device is configured to control the first peripheral device by sending control commands to the first peripheral device.

31. The device control method of claim 30, wherein the control commands are transmitted from the second peripheral device to the first peripheral device via the first network device and the second network device.

32. The device control method of claim 30, wherein the control commands are transmitted from the second peripheral device to the first peripheral device on a transmission path that does not comprise the first network device and the second network device.

* * * * *